(12) United States Patent
Nagai

(10) Patent No.: US 8,243,335 B2
(45) Date of Patent: Aug. 14, 2012

(54) DEVICE FOR CHANGING SCREEN RULING FOR IMAGE FORMATION IN ACCORDANCE WITH RELATIONSHIP BETWEEN LUMINANCE AND SATURATION

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 12/241,543

(22) Filed: Sep. 30, 2008

(65) Prior Publication Data

US 2009/0086227 A1 Apr. 2, 2009

(30) Foreign Application Priority Data

Oct. 2, 2007 (JP) ................................ 2007-258871

(51) Int. Cl.
*G06K 15/00* (2006.01)
*H04N 1/405* (2006.01)
(52) U.S. Cl. ...... 358/3.07; 358/1.9; 358/3.06; 358/3.13; 358/3.15; 358/3.26; 358/3.27; 358/520; 358/532; 358/534; 358/536
(58) Field of Classification Search ................... 358/1.9, 358/3.26–3.27; 382/254–269
See application file for complete search history.

(56) References Cited

U.S. PATENT DOCUMENTS

| 4,736,254 | A | * | 4/1988 | Kotera et al. | ................ | 358/3.23 |
| 5,742,410 | A | * | 4/1998 | Suzuki | ........................... | 358/518 |
| 6,456,393 | B1 | * | 9/2002 | Bhattacharjya et al. | ....... | 358/1.9 |
| 6,549,303 | B1 | * | 4/2003 | Trask | ............................. | 358/1.9 |
| 6,721,062 | B1 | * | 4/2004 | Sawada et al. | ................. | 358/1.9 |
| 6,859,219 | B1 | * | 2/2005 | Sall | ................................ | 345/1.1 |
| 6,880,915 | B2 | * | 4/2005 | Shimada | ......................... | 347/43 |
| 7,746,505 | B2 | * | 6/2010 | Lim | ............................. | 358/3.27 |
| 2002/0114012 | A1 | | 8/2002 | Fujita | | |
| 2004/0017579 | A1 | * | 1/2004 | Lim | ............................. | 358/1.9 |
| 2007/0189615 | A1 | * | 8/2007 | Liu et al. | ...................... | 382/232 |

FOREIGN PATENT DOCUMENTS

| JP | 11-055519 | 2/1999 |
| JP | 11-187270 | 7/1999 |
| JP | 2002-223357 | 8/2002 |

OTHER PUBLICATIONS

John T Chittick, Effect of Screen Ruling on the Saturation of Pastel Gamut Colors, Master of Science Thesis at Rochester Institute of Technology, Nov. 1980.*

* cited by examiner

*Primary Examiner* — Richard Zhu
(74) *Attorney, Agent, or Firm* — Fitzpatrick, Cella, Harper & Scinto

(57) ABSTRACT

The present invention relates to a device that, in printing of controlling the amount of color materials applied, changes a screen ruling for image formation according to the relationship between luminance and saturation. A first component obtains color component data of a plurality of colors so that the total amount of controlled variable in each pixel does not exceed a first limit amount. A second component obtains color component data of a plurality of colors so that the total amount of controlled variable in each pixel does not exceed a second limit amount by performing color conversion processing different from the color conversion processing with the first component. A third component performs pseudo halftone processing by changing a screen ruling to be applied to the color component data of a plurality of colors obtained by the color conversion processing with the second component from chromaticity of color image data.

6 Claims, 20 Drawing Sheets

| | REGION 1 | REGION 2 |
|---|---|---|
| THE AMOUNT OF TONER APPLIED 200% | LOW SCREEN RULING | LOW SCREEN RULING |
| THE AMOUNT OF TONER APPLIED 100% | LOW SCREEN RULING | HIGH SCREEN RULING |

| R | G | B | C | M | Y | K |
|---|---|---|---|---|---|---|
| 0 | 0 | 0 | 33 | 33 | 33 | 100 |
| ⋮ | | | | ⋮ | | |
| 0 | 0 | 128 | 67 | 67 | 16 | 0 |
| ⋮ | | | | ⋮ | | |
| 0 | 0 | 255 | 100 | 100 | 0 | 0 |
| ⋮ | | | | ⋮ | | |
| 0 | 128 | 255 | 100 | 50 | 0 | 0 |
| ⋮ | | | | ⋮ | | |
| 0 | 255 | 255 | 100 | 0 | 0 | 0 |
| ⋮ | | | | ⋮ | | |
| 255 | 255 | 255 | 0 | 0 | 0 | 0 |

| R | G | B | C | M | Y | K |
|---|---|---|---|---|---|---|
| 0 | 0 | 0 | 0 | 0 | 0 | 100 |
| ⋮ | | | ⋮ | | | |
| 0 | 0 | 128 | 25 | 25 | 10 | 0 |
| ⋮ | | | ⋮ | | | |
| 0 | 0 | 255 | 50 | 50 | 0 | 0 |
| ⋮ | | | ⋮ | | | |
| 0 | 128 | 255 | 75 | 25 | 0 | 0 |
| ⋮ | | | ⋮ | | | |
| 0 | 255 | 255 | 100 | 0 | 0 | 0 |
| ⋮ | | | ⋮ | | | |
| 255 | 255 | 255 | 0 | 0 | 0 | 0 |

|  | REGION 1 | REGION 2 |
|---|---|---|
| THE AMOUNT OF TONER APPLIED 1 | SCREEN 1 | SCREEN 1 |
| THE AMOUNT OF TONER APPLIED 2 | SCREEN 1 | SCREEN 2 |

FIG.7

|  | REGION 1 | REGION 2 |
|---|---|---|
| THE AMOUNT OF TONER APPLIED 200% | LOW SCREEN RULING | LOW SCREEN RULING |
| THE AMOUNT OF TONER APPLIED 100% | LOW SCREEN RULING | HIGH SCREEN RULING |

FIG.9

|  | TEXT | GRAPHIC | IMAGE |
|---|---|---|---|
| THE AMOUNT OF TONER APPLIED 1 | COLOR CONVERSION TABLE 1 | COLOR CONVERSION TABLE 1 | COLOR CONVERSION TABLE 2 |
| THE AMOUNT OF TONER APPLIED 2 | COLOR CONVERSION TABLE 3 | COLOR CONVERSION TABLE 3 | COLOR CONVERSION TABLE 4 |

FIG.17

|  | TEXT | GRAPHIC | IMAGE |
|---|---|---|---|
| REGION 1 | SCREEN 1 | SCREEN 1 | SCREEN 1 |
| REGION 2 | SCREEN 2 | SCREEN 2 | SCREEN 1 |
| REGION 3 | SCREEN 3 | SCREEN 2 | SCREEN 1 |

FIG.19

DEVICE FOR CHANGING SCREEN RULING FOR IMAGE FORMATION IN ACCORDANCE WITH RELATIONSHIP BETWEEN LUMINANCE AND SATURATION

BACKGROUND OF THE INVENTION

1. Field of the Invention

The present invention relates to an image processing device and an image processing method and, in particular, relates to an image processing device and an image processing method of obtaining a higher quality printed matter while controlling the amount of color materials applied such as toner or ink.

2. Description of the Related Art

There are increasing chances to print data created by e.g., a personal computer using an image processing device having a printing function. Since the amount of consumption of color materials drastically affects running costs, there has conventionally been known an image processing device having the function intending to reduce the amount of consumption of color materials to be used. General methods of implementing a saving function of such color materials include the method of reducing the density value of each color corresponding to each color material of image data before printing.

In an electrophotographic image processing device typified by a laser printer of laser beam exposure type, although image formation is performed by adhering a toner, there are present various types of materials to be used for printing. On this occasion, in some cases, depending on the type of material, toner does not fix fully and toner is splashed, or toner comes out at the portion of high dot density. As measures to cope with these problems, the method of reducing the amount of toner adhesion is taken. The implementation method thereof includes the one that reduces the density value or the gradation value of each color corresponding to each color material of image data before printing.

In addition, recently not only reduction in the amount of consumption of color materials or effects on the material as mentioned above, but also noticed are effects of decrease of a fixing temperature of a fixing unit by reducing the amount of color materials applied per each pixel. Due to this decreased fixing temperature, effects of power saving of the fixing unit, downsizing, and shortening of a first copy-out time are expected.

However, in case where the amount of color materials applied is decreased, there is a possibility of image deterioration as compared with the case of the normal applied amount. Specifically, there is a possibility of reduced reproduction capability due to narrowed color regions able to be reproduced. Furthermore, contour portions of e.g., such characters or graphics as to be at the maximum density at the time of the normal applied amount come to be of halftone colors owing to the decrease in density of image data. As a result of halftone processing, there is a possibility of the occurrence of jaggy (stepped jaggy that appears on slanting lines) or discontinuity. Conventionally, since at the time of setting a saving function of color materials, proof or draft printing is assumed, an image quality tends not to be regarded as important. In recent years, however, various effects as described above have been known, and high quality on the occasion of reducing the amount of color materials applied is expected.

As a countermeasure against image deterioration (jaggy, discontinuity or the like) on such occasion of controlling the amount of color materials applied, conventionally proposed is the one that an edge determination is made with respect to character portions or graphic portions, and specific processing such as contour enhancement and pattern replacement is performed only with respect to the edge portions (Japanese Patent Laid-Open No. 11-55519 and Japanese Patent Laid-Open No. 11-187270). Furthermore, generally as a countermeasure against jaggy or discontinuity at the edge portion illustrated with halftone colors, increase of the density of a halftone dot at the time of image formation, that is higher screen ruling has been known. Normally, the type of object to be printed is included in a print data as information. Thus, changes in a screen ruling depending on the type of object, that is the method of applying a high screen ruling to e.g., characters and graphics, and on the other hand, applying a low screen ruling with respect to a nature image has been conducted. As to a screen ruling, in the case of printing an image, fine halftone dots arranged on a contact screen film is overlapped on the image, and by receiving lights passing through the halftone dots, shading of the image is converted to the size and the density of the halftone dots. Here, the halftone dots are provided at the high density with increasing proximity to the center. Bright lights are extracted as small dots and dark lights are extracted as large dots. The screen ruling component how many lines of halftone dots are present in the width of about 25.4 mm (1 inch), and the unit is indicated with lpi (line per inch). In general, when using a high screen ruling, the halftone dots come to be unobstructive with naked eyes and high quality printed matters can be obtained; whereas, when using a low screen ruling, the halftone dots become marked and thus printed matters show rough appearance. However, in electrophotographic image processing devices, since electrophotographic processes are unstable when using high screen ruling, a problem exists in the occurrence of discontinuity and instability of density characteristics. To solve these problems, for example, in Japanese Patent Laid-Open No. 2002-223357, proposed is the one of switching a screen ruling in accordance with an output density value. Here, in the low-density region, the screen ruling is decreased, and output characteristics of the electrophotographic process are made stable, while in the high density region, the high screen ruling is applied, thus enabling a high-resolution and sharp output.

However, conventional countermeasures against jaggy or discontinuity on the occasion of controlling the amount of color materials applied requires the function of edge determination. Here, in case of implementing the edge determination function, line buffer and the like for use in pattern matching comes to be necessary, thus to be costly. Furthermore, the edge determination may raise error determination, and this error determination may result in image deterioration.

On the other hand, increase of the screen ruling, to keep stability of the electrophotographic process, irrespective of the king of objects, is desirably performed selectively based on image data. However, in the conventional method of switching screens in accordance with a density value, in the case in which the amount of color materials applied is controlled, since the density value is varied by control of the applied amount, it is difficult to make appropriate switching of screens.

SUMMARY OF THE INVENTION

The present invention, without using an edge determination function, calculates chromaticity from color signals before color conversion and changes a screen ruling for image formation in accordance with the relationship between luminance and saturation. The present invention has an object to prevent image deterioration at the edge portions even in the case of the occurrence of changes in density by controlling the amount of color materials applied.

The present invention is an image processing device provided with a plurality of colors of color materials. The processing device includes a first color conversion component, a second color conversion component, and a pseudo halftone processing component. The first color conversion component is configured to obtain color component data of the plurality of colors so that the total amount of controlled variable in each pixel does not exceed a first limit amount by performing color conversion processing on image data. The second color conversion component is configured to obtain color component data of the plurality of colors so that the total amount of controlled variable in each pixel does not exceed a second limit amount by performing color conversion processing different from that by the first color conversion component on the image data. The pseudo halftone processing component is configured to obtain a plurality of pseudo halftone data by performing pseudo halftone processing on the color component data of the plurality of colors obtained with the first color conversion component or the second color conversion component. The pseudo halftone processing component performs pseudo halftone processing by switching a screen ruling to be applied to the color component data of the plurality of colors obtained by color conversion processing with the second color conversion component based on chromaticity obtained from the image data.

The present invention is an image processing method in an image processing device provided with a plurality of colors of color materials. The processing method includes a first step, a second step, and a third step. In the first step, color component data of the plurality of colors is obtained so that the total amount of controlled variable in each pixel does not exceed a first limit amount by performing color conversion processing on image data. In the second step, color component data of the plurality of colors is obtained so that the total amount of controlled variable in each pixel does not exceed a second limit amount by performing color conversion processing different from the color conversion processing in the first step on the image data. In the third step, a plurality of pseudo halftone data is obtained by performing pseudo halftone processing on the color component data of the plurality of colors obtained in the first step or the second step. In the third step, pseudo halftone processing is performs by switching a screen ruling to be applied to the color component data of the plurality of colors obtained by color conversion processing in the second step based on chromaticity obtained from the image data.

The present invention is a computer-readable recording medium having computer-executable instructions for performing the above-mentioned image processing method.

The present invention is an image processing device that includes a determination component and an application component. The determination component is configured to determine whether in each region included in image data, saturation is higher than a saturation threshold or not, and luminance is lower than a luminance threshold or not. The application component is configured to apply a high screen ruling to a region determined to have saturation higher than the saturation threshold and to have luminance lower than the luminance threshold, while to apply a low screen ruling to a region determined to have saturation lower than the saturation threshold and to have luminance higher than the luminance threshold.

The present invention, in printing of controlling the amount of color materials applied, without employing an edge determination function, calculates chromaticity from color signals before color conversion, and changes a screen ruling for image formation in accordance with the relationship between luminance and saturation, thereby enabling to prevent image deterioration.

Further features of the present invention will become apparent from the following description of exemplary embodiments (with reference to the attached drawings).

BRIEF DESCRIPTION OF THE DRAWINGS

FIG. 7 is a table showing one example of a table for use in determining the type of screen at a screen determination unit in the first embodiment;

FIG. 9 is a table showing one example of a table for use in determining the type of screen at the screen determination unit in the first embodiment;

FIG. 17 is a chart showing a method of switching color conversion tables to be applied at a color conversion processing unit in the fourth embodiment;

FIG. 19 is a table for illustrating a screen determination method at a screen determination unit of the fourth embodiment.

DESCRIPTION OF THE EMBODIMENTS

Figure 1:
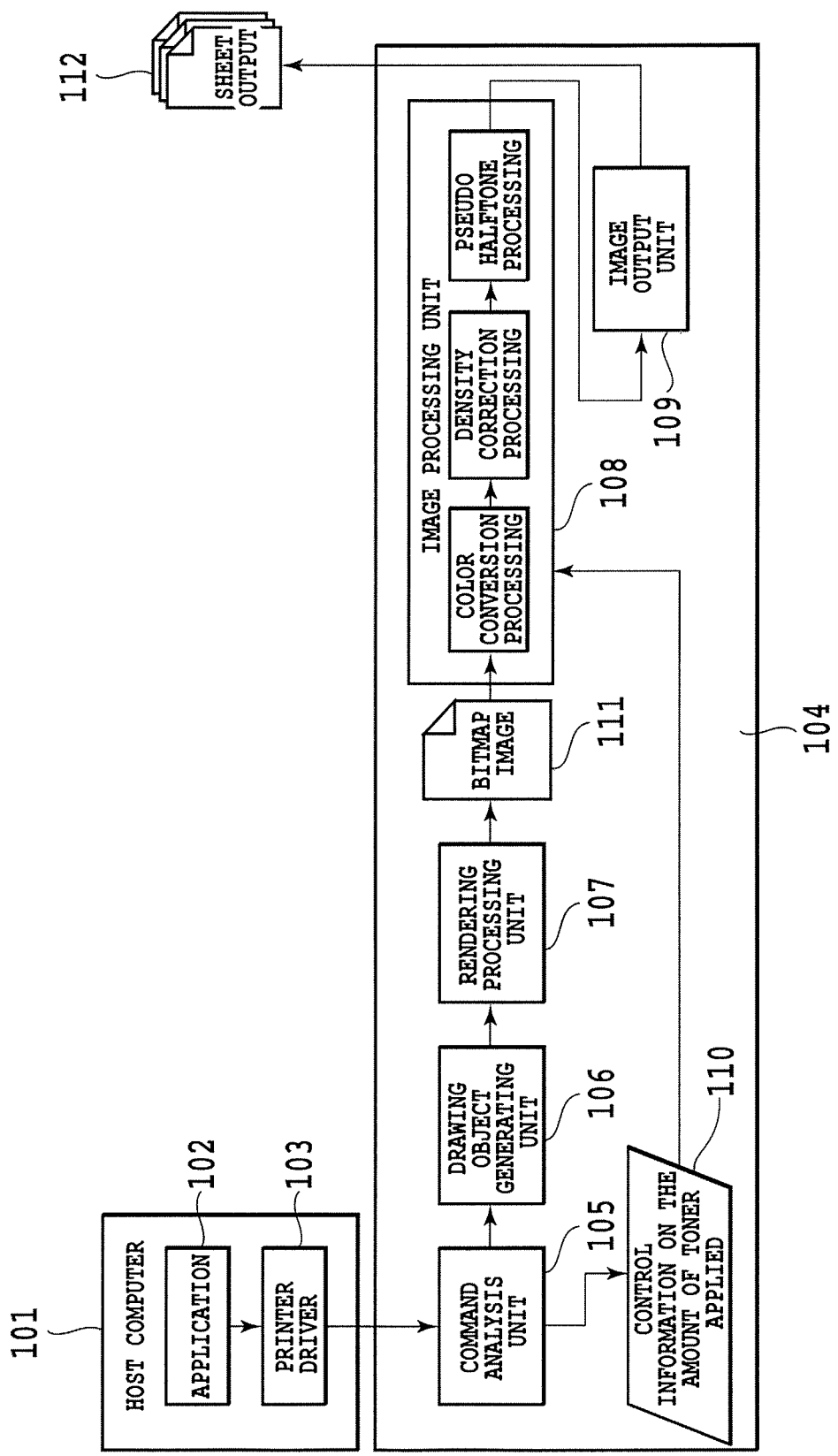
FIG. 1 is a block diagram illustrating a configuration example of an image processing system.

Hereinafter, exemplary embodiments according to the present invention will be described referring to the drawings.

Incidentally, although the case of being applied to a laser beam printer will be described hereinafter as an exemplary embodiment according to the present invention, the present invention is not limited to this case, and is applicable to an image processing device such as any printer or facsimile without departing from the scope of the present invention.

First Embodiment

FIG. 1 is a block diagram illustrating a configuration example of an image processing system provided with a host computer 101 and an image processing device 104.

The host computer 101 is provided with an application 102 and a printer driver 103.

The application 102 is an application program operating on the host computer 101. A user, by using the application 102, creates digital document data such as page layout documents, word processor documents and graphic documents. The application 102 sends the created digital document data to the printer driver 103. The printer driver 103 generates a drawing command based on the received digital document data. The drawing command to be generated is generally a printer description language for creating page image data that is referred to as PDL (Page Description Language). The drawing command normally includes a drawing instruction of data such as characters, graphics or images. In addition, the drawing command also includes information on the amount of color materials applied such as a saving mode or a control mode of the amount of color materials applied.

The printer driver 103 transmits the generated drawing command to the image processing device via e.g., a network.

The image processing device 104 converts the drawing command received from the host computer 101 to image data, and performs processing to print it onto a page space.

The image processing device 104 includes a command analysis unit 105, a drawing object generating unit 106, a rendering processing unit 107, an image processing unit 108 and an image output unit 109.

The command analysis unit 105 analyzes the drawing command received from the host computer 101, and transmits the analysis result to the drawing object generating unit 106. Furthermore, the command analysis unit 105 extracts control information on the amount of toner applied 110, the control information being included in the drawing command.

The drawing object generating unit 106 generates a drawing object based on the analysis result and transmits it to the rendering processing unit 107.

The rendering processing unit 107 performs rendering (imaging) the drawing object, generates a bitmap image 111, and transmits it the image processing unit 108.

The image processing unit 108 performs image processing such as color conversion processing, density correction processing and pseudo halftone processing on the bitmap image 111, thereby converting the bitmap image 111 to image data of a predetermined image format, and outputs it to the image output unit 109. Details of the image processing unit will be described below.

The image output unit 109 performs output processing on the image data of a predetermined image format.

BY the above processing, the image processing device 104 processes the image data generated based on the drawing command received from the host computer 101, and prints it on a sheet (112).

Figure 2:
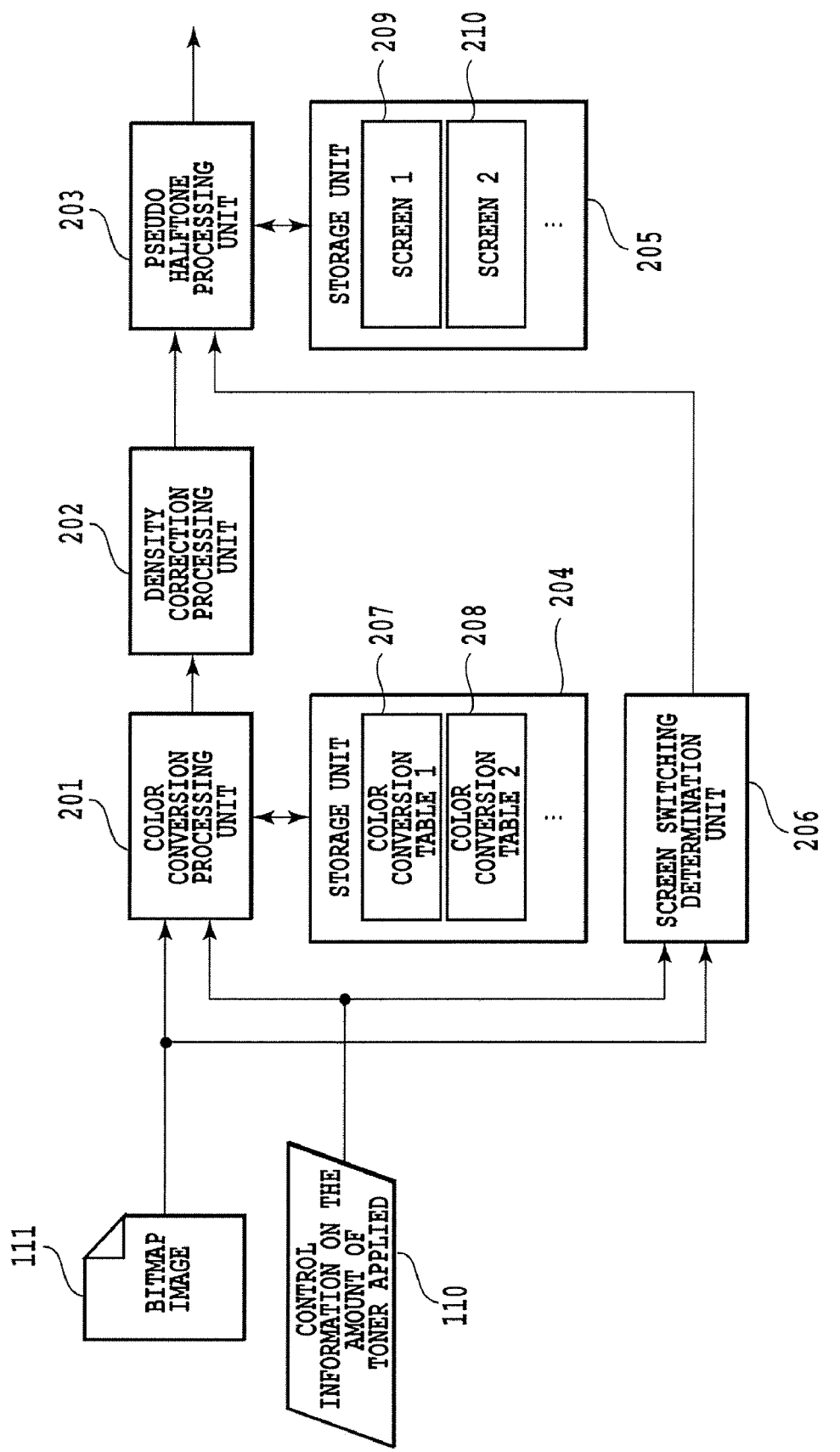
FIG. 2 is a block diagram illustrating a configuration example of an image processing unit in a first embodiment.

FIG. 2 is a block diagram illustrating a detailed configuration example of the image processing unit 108.

The image processing unit 108 includes a color conversion processing unit (a first color conversion component) 201, a density correction processing unit 202, a pseudo halftone processing unit 203, a storage unit 204, a storage unit 205 and a screen switching determination unit 206. The storage unit 204 stores a plurality of color conversion tables (a color conversion table 1, a color conversion table 2 and the like), and the storage unit 205 stores a plurality of screens (a screen 1, a screen 2 and the like).

An output to the image output unit 109 is image data corresponding to color materials of a plurality of colors (four colors) of cyan (C), magenta (M), yellow (Y) and black (K), and the bitmap image 111 to be received from the rendering processing unit 107 is image data of RGB color space.

The color conversion processing unit 201 first performs color conversion processing of converting the bitmap image 111, being RGB color space image data, to CMYK color space image data, being color component data of a plurality of colors, using the color conversion tables stored in the storage unit 204.

The color conversion processing unit 201, using the other control information, can perform color conversion processing by switching a plurality of color conversion tables. That is, the color conversion processing unit 201 can refer to different color conversion tables at respective objects in image data, or can switch the color conversion tables in accordance with a print mode. In the color conversion processing using the color conversion tables, an under color removal (UCR) processing is also performed at the same time, and generally a plurality of color conversion tables of different UCR amounts is used by being switched depending on the type of object.

In the color conversion processing with the color conversion tables, the total amount of controlled variable with respect to each pixel of the converted image data, that is the total amount (the amount of toner applied) of CMYK data per one pixel can be controlled.

The color conversion processing unit 201, based on the control information on the amount of toner applied 110 extracted from within the drawing command, switches the color conversion tables (the color conversion table 1 and the color conversion table 2) stored in the storage unit 204. Specifically, the color conversion table 1 is referred to in the case of "amount of toner applied 1" of the control information on the amount of toner applied 110; and the color conversion table 2 is referred to in the case of "amount of toner applied 2".

FIGS. 3A and 3B, and FIGS. 4A and 4B are charts for illustrating the color conversion tables.

The color conversion tables are three-dimensional lookup tables, RGB data before color conversion has 256 gradations (8 bits), and CMYK data after color conversion has density values from 0% to 100%.

Figures 3A, 3B:
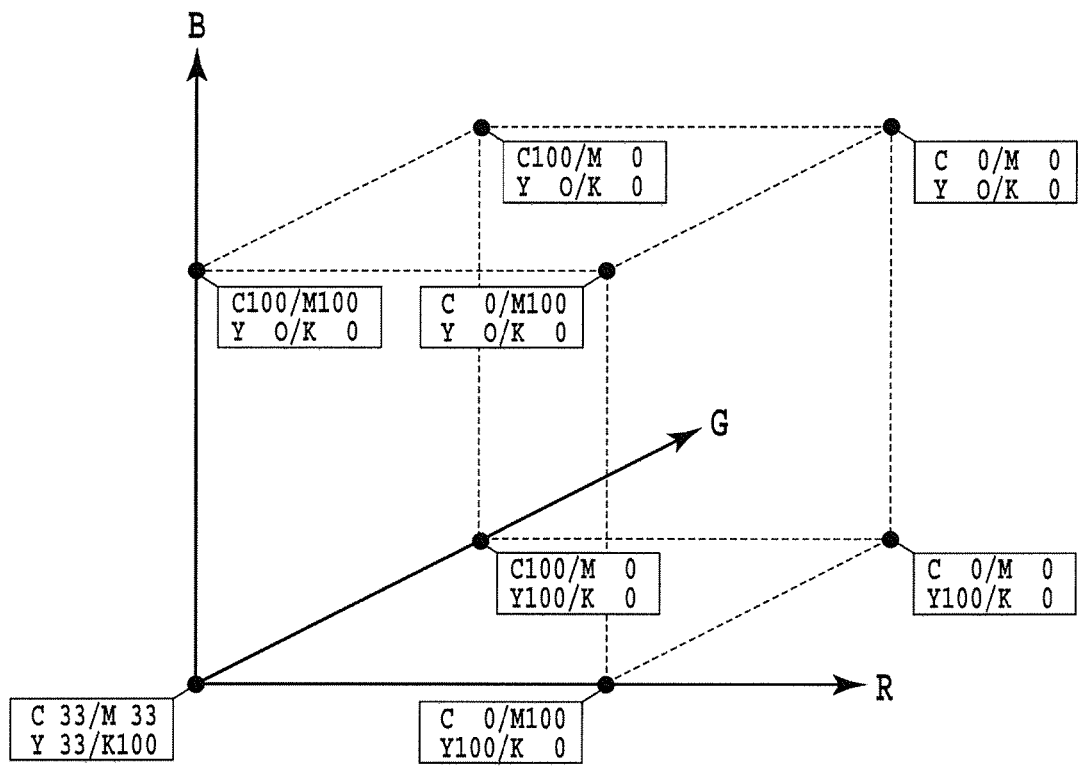
FIG. 3A is a chart for illustrating a color conversion table in the first embodiment.
FIG. 3B is a chart for illustrating the color conversion table in the first embodiment.
Figures 4A, 4B:
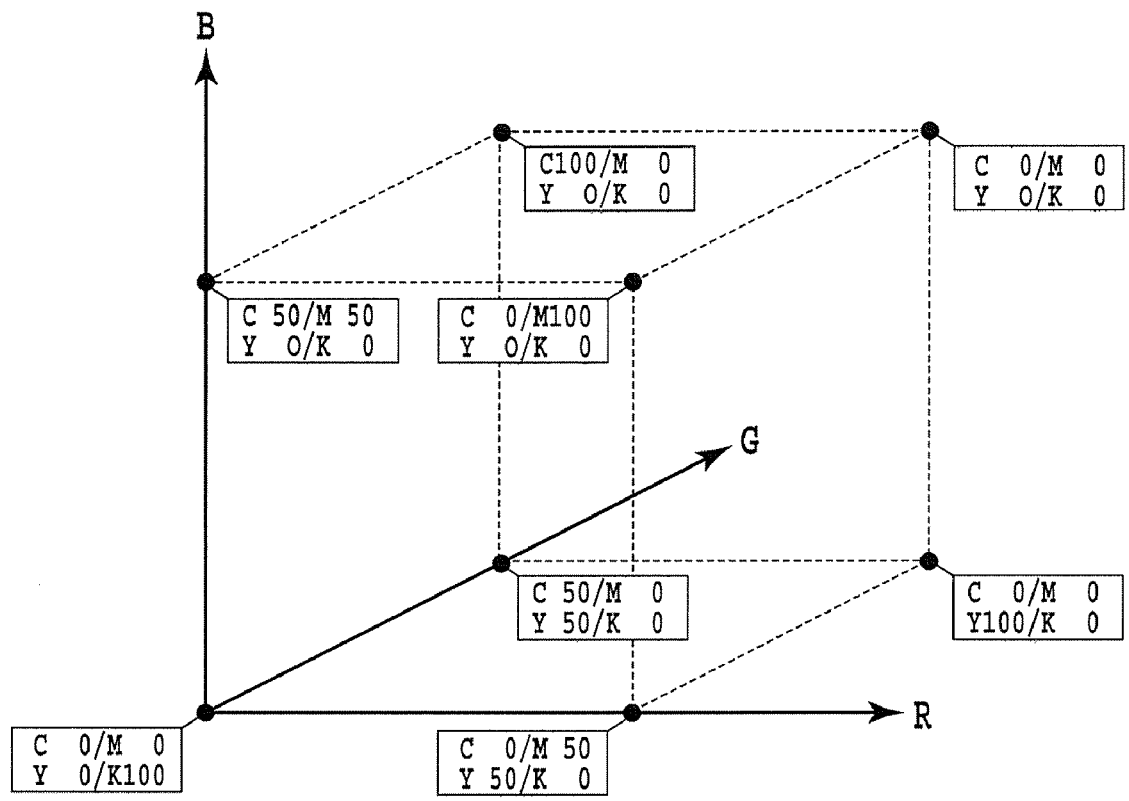
FIG. 4A is a chart for illustrating a color conversion table in the first embodiment.
FIG. 4B is a chart for illustrating the color conversion table in the first embodiment.

FIG. 3A illustrates the color conversion table 1 when the limit of the amount of toner applied is 200%. FIG. 4A illustrates the color conversion table 2 when the limit of the amount of toner applied is 100%.

FIG. 3A and FIG. 4A are charts illustrating the color conversion tables three-dimensionally, and FIG. 3B and FIG. 4B are charts illustrating the color conversion tables actually stored in the storage unit 204.

The color conversion processing unit 201 refers to the color conversion tables with respect to three signals of RGB of an input pixel, and obtains corresponding CMYK values to perform color conversion processing. Incidentally, registering CMYK values corresponding to all the RGB signals in the color conversion tables requires a large storage capacity. Thus, normally in the color conversion tables, as illustrated in FIG. 3B and FIG. 4B, only CMYK values at a predetermined grid points on the three-dimensional lookup table are registered. The CMYK values at points other the grid points are calculated by the interpolation such as tetrahedral interpolation calculation with respect to the CMYK values at the grid points.

When using the color conversion table 1 illustrated in FIG. 3B, data of, for example, R=0, G=0 and B=255 is converted to C=100, M=100, Y=0 and K=0. Further, data of R=0, G=255 and B=255 is converted to C=100, M=0, Y=0 and K=0. In either case, the total amount of CMYK does not exceed 200%.

When using the color conversion table 2 illustrated in FIG. 4B, data of, for example, R=0, G=0 and B=255 is converted to C=50, M=50, Y=0 and K=0. This reason is that the total amount of CMYK is controlled to 100%, and the CMYK values after color conversion are different from those in the case of using the color conversion table 1. On the other hand, the data of R=0, G=255 and B=255 is converted to C=100, M=0, Y=0 and K=0, which are the same as those in the case of using the color conversion table 1.

As described above, the color conversion processing unit 201, by using the color conversion tables by switching thereof in accordance with the control information on the amount of toner applied 110, can switch the amount of toner applied per one pixel. Incidentally, although in this embodiment, there are provided two types of color conversion tables, and respective limits of the amount of toner applied are to be 200% and 100%, it is not limited to these cases. It is preferable to be a larger number of types of tables, and it is preferable to be various limits of the amount of toner applied in accordance with engine characteristics and the intended purpose of control of the amount of toner applied.

The density correction processing unit 202 performs density correction processing on image data color-converted at the color conversion processing unit 201. Normally, when screens are switched in the pseudo halftone processing unit 203, the density correction processing unit 202 needs to switch the content of the density correction processing based on a screen. Incidentally, the density correction processing unit 202 performs density correction processing also on the occasion of changes in density with time or changes in density due to an environmental variation.

The pseudo halftone processing unit 203, with respect to the density-corrected image data, applies screens stored in the storage unit 205, and performs pseudo halftone processing. The image output unit 109 can normally output only low gradations such as 2, 4 and 16 gradations. Thus, the pseudo halftone processing unit 203 performs pseudo halftone processing so as to be able to output stable halftones even at the image output unit 109 that can only output low levels of gradations, and outputs pseudo halftone data.

Incidentally, the pseudo halftone processing unit 203 can apply a plurality of screens by switching thereof in accordance with the other control information. Due to the fact that print characteristics vary depending on the type of the applied screen, the pseudo halftone processing unit 203 may perform processing by switching a plurality of screens based on characteristics of image data or the purpose of printing. In this embodiment, it is determined whether to perform switching the screens, based on the control information on the amount of toner applied 110 and the chromaticity of the input image data.

Figure 5:
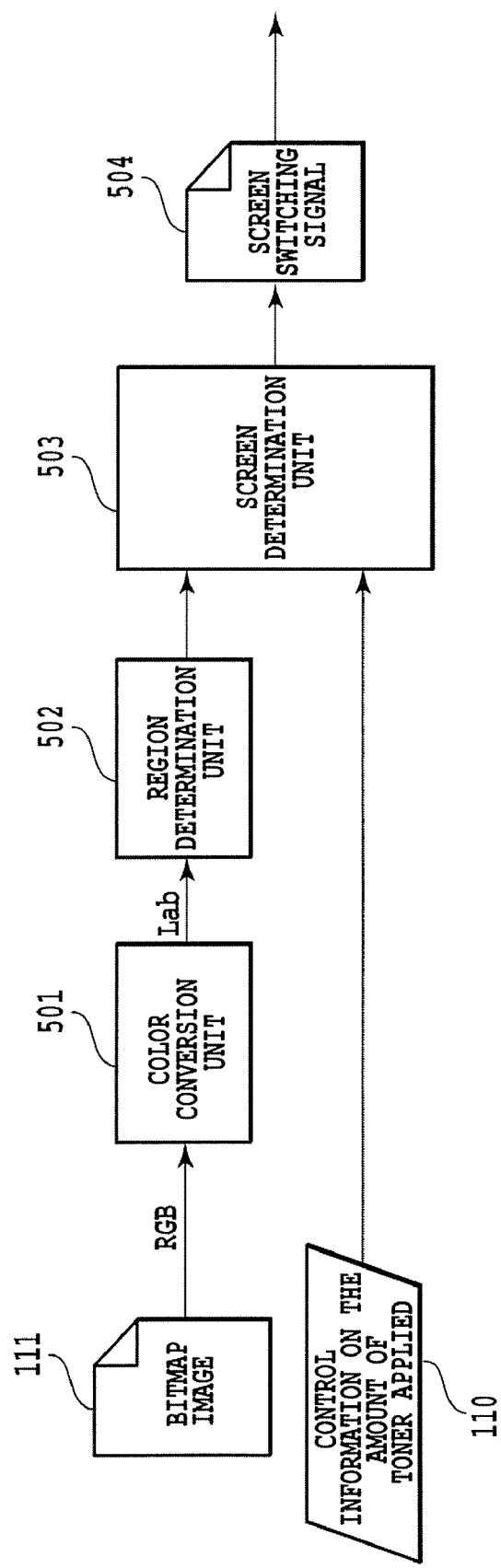
FIG. 5 is a block diagram illustrating a configuration example of a screen switching unit in the first embodiment.

FIG. 5 is a block diagram illustrating a configuration example of the screen switching determination unit 206.

The screen switching determination unit 206 includes a color conversion unit (a second color conversion component) 501, a region determination unit 502, and a screen determination unit 503.

The color conversion unit 501 converts a bitmap image 111, being RGB color space image data, into a color space to be used for determination of switching the screens. The color space to be used for determination is desirably the uniform perceptual color space. Thus, CIE-Lab, being the uniform perceptual color space, is employed in this embodiment.

The color conversion unit 501 converts the bitmap image of the RGB color space to the CIE-Lab color space. Specifically, the RGB color space is converted into the CIE-XYZ color space, and the CIE-XYZ color space is converted into the CIE-Lab color space. The calculation method for use in this color conversion is known, so that descriptions thereof will be omitted.

The region determination unit 502 determines the region in which each pixel converted to the CIE-Lab color space is contained, based on the chromaticity of the pixel. The determination of the region is made in order to discern whether or not the edge of an input image before color conversion processing is clear.

Figure 6:
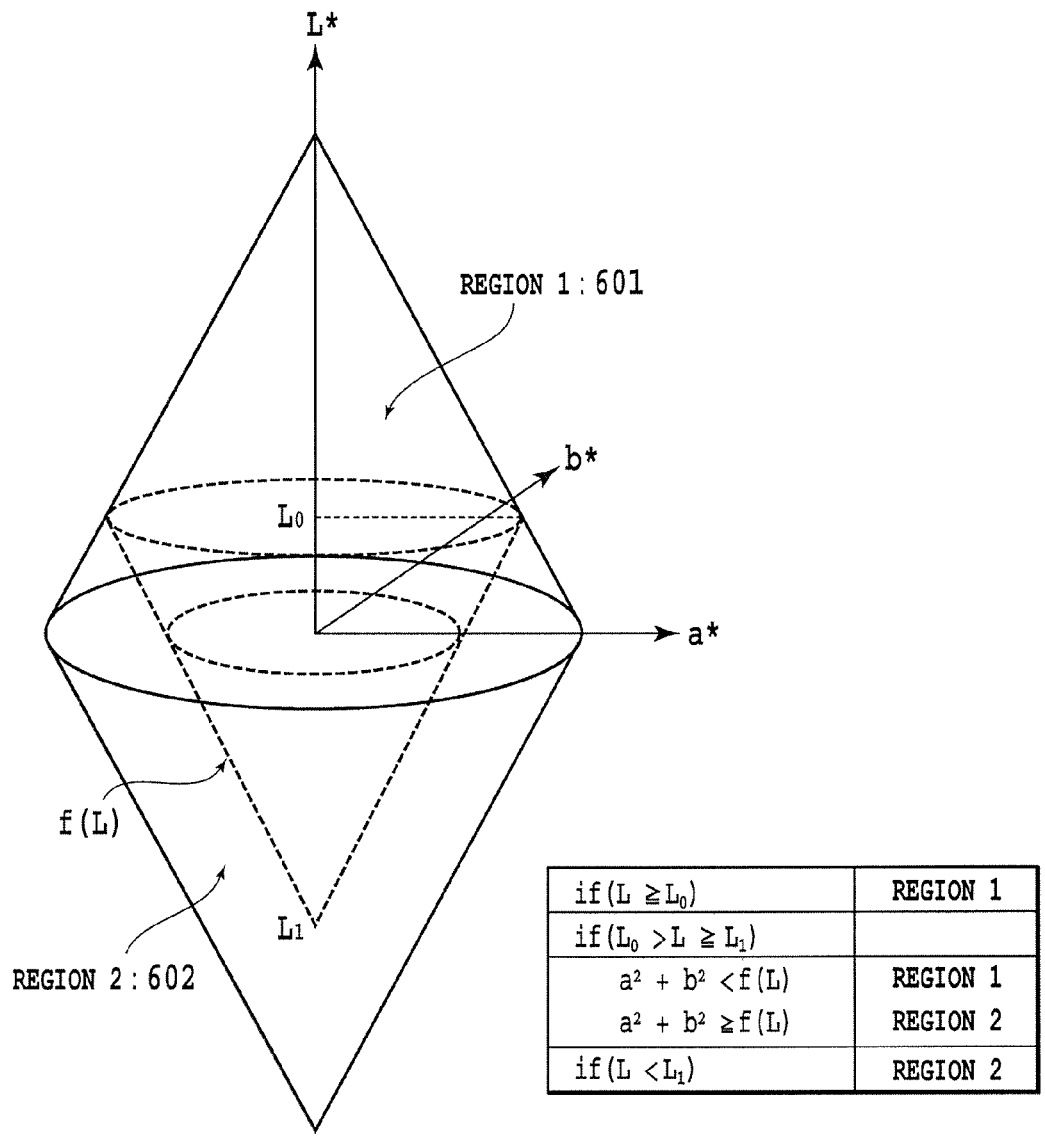
FIG. 6 is a chart for illustrating a determination method of a region in the first embodiment in the uniform perceptual color space.

FIG. 6 is a chart for illustrating the determination method of a region in the uniform perceptual color space.

FIG. 6 uses the CIE-Lab color space as the uniform perceptual color space. In this embodiment, in the CIE-Lab color space, the color space is divided into two regions of a region 1 (601) and a region 2 (602).

Hereinafter, the division method of the regions will be described with reference to FIG. 6.

The region determination unit 502 refers to luminance L and saturation ($a^2+b^2$) when dividing regions.

The region determination unit 502 compares luminance L of a pixel of the input image data and predetermined luminance (L0), and determines the region to be the region 1 in the case in which the luminance L is not less than L0. Furthermore, the region determination unit 502 compares the luminance L and predetermined luminance L1 different from the luminance L0, and determines the region to be the region 2 in the case in which the luminance L is less than the luminance L1. Here, the relationship between the luminance L0 and the luminance L1 is the luminance L0>the luminance L1. In the case in which the luminance L is not less than the luminance L1 and less than the luminance L0, a threshold f (L) based on the luminance L is set. Further, the region determination unit 502, based on a comparison result between this threshold and the saturation (whether or not the saturation is not less than the threshold or less than the threshold), determines the region. That is, in case where the input saturation ($a^2+b^2$) of the pixel is not less than the threshold f (L), the region is determined to be the region 2; and in case where it is less than the threshold f (L), the regions is determined to be the region 1.

As described above, determination of regions is made in order to discern whether or not the edge of an input image before color conversion processing is clear. Normally, in the case of digital documents created with an application on a host computer, the one of low luminance and high saturation is what has clear edges. Thus, based on the chromaticity of the bitmap image ill before color conversion processing, division between the region 2 (602) of clear edges and the region 1 (601) of unclear edges is performed. Whereby, with respect to the image data color-converted using a plurality of color conversion tables to be used by switching in accordance with the control information on the amount of toner applied 110, the region determination based on an input image can be made.

Incidentally, the threshold f (L) may be the one that is substantially linear as illustrated in FIG. 6, or the one that is referred to from the luminance L using a lookup table.

As described above, after the region determination unit 502 determined the region of the input image data based on chromaticity, the screen determination unit 503 determines the type of screen to be applied with respect to each pixel based on the region determination result and the control information on the amount of toner applied 110.

FIG. 7 is a table for illustrating the determination method of the type of screen to be applied.

The screen determination unit 503 first, based on the control information on the amount of toner applied 110, checks which amount of toner applied of color conversion processing the color conversion unit 501 performs. Subsequently, the screen determination unit 503, based on the region determination result by the region determination unit 502, determines the type of screen to be applied. The screen determination unit 503 makes a determination of applying "screen 2" in the case in which the control information on the amount of toner applied 110 is "the amount of toner applied 2" and the region determination result is "region 2", and makes a determination of applying "screen 1" other than this case.

Incidentally, determination of the type of screen is made in association with each pixel of a bitmap image, and a screen switching signal 504 indicating information on switching among screens corresponds to the bitmap image.

The pseudo halftone processing unit 203, based on the screen switching signal 504 received from the screen switching determination unit 206, performs pseudo halftone processing of switching screens with respect to each pixel.

This embodiment switches screens based on the chromaticity of a pixel of an input image, and does not switch screens for each object. Therefore, there is a possibility of the occurrence of switching among screens in the same object. On this occasion, to prevent the gap of continuity and density at the portion where switching among the screens is made, in this embodiment, the following screen is used.

Figure 8:
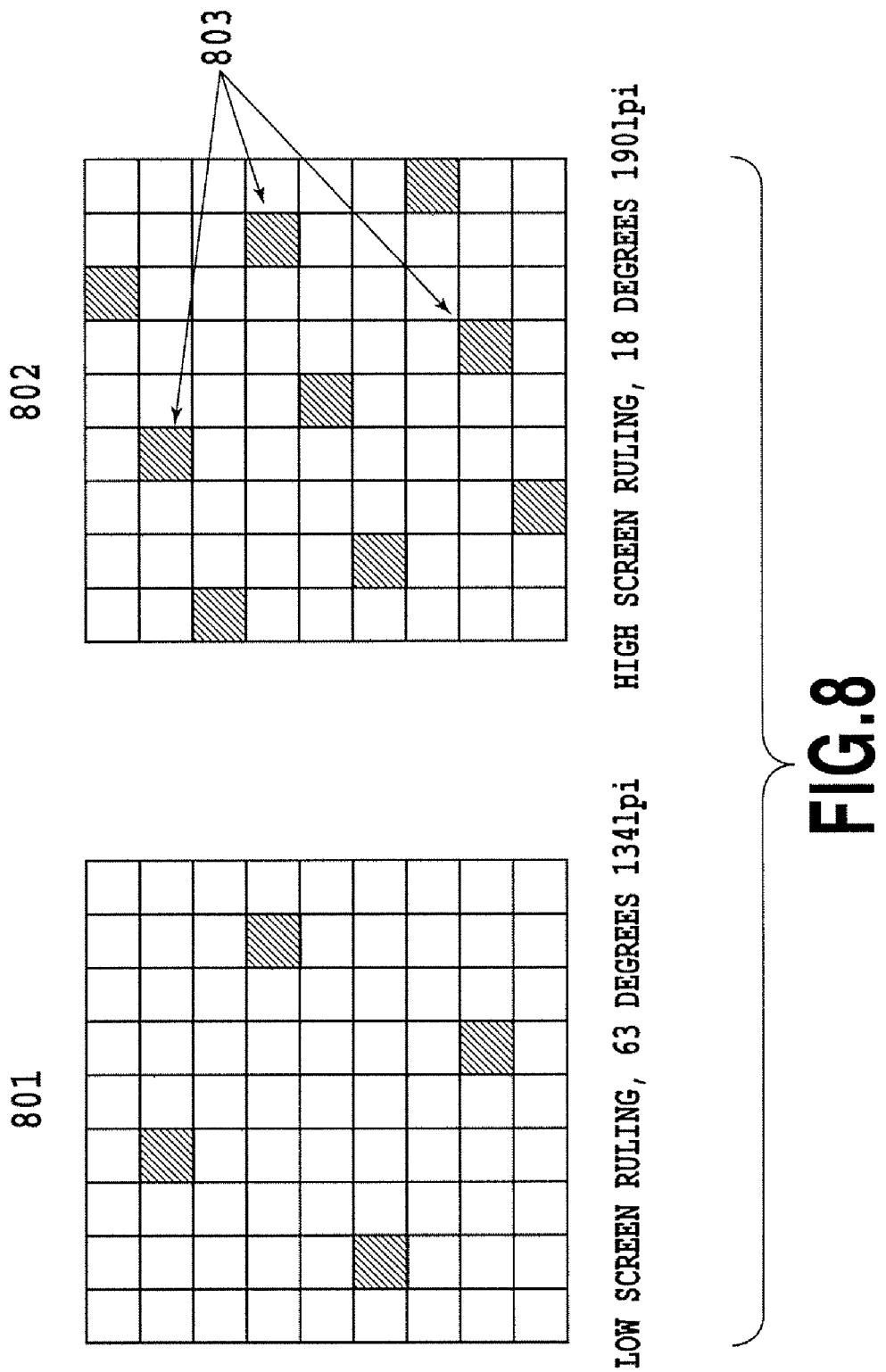
FIG. 8 is a chart illustrating an example of the screen to be used in the first embodiment.

FIG. 8 is a chart of illustrating an example of screens to be used in this embodiment.

In the case of applying screens of different screen rulings adjacent to each other, normally, there is a possibility of the occurrence of discontinuous regions at the boundary of the screens. Thus, in this embodiment, this problem is solved by using the screens illustrated in FIG. 8.

Reference numeral 801 designates a low screen ruling, and reference numeral 802 designates a high screen ruling. The low screen ruling 801 is of 63 degrees and 134 lpi, and the high screen ruling 802 is of 18 degrees and 190 lpi. As illustrated, although both of them have characteristics different from each other in both the angle and the ruling, the points (803) indicated with more dense dots at a growing point of the high screen ruling is positioned in the same position as the growing point of the low screen ruling. As a result, even if these two screens are applied to adjacent pixels in a certain region, there is no occurrence of a problem of the generation of the discontinuous regions at the boundary.

Here, "screen 1" is to be a low screen ruling, and "screen 2" is to be a high screen ruling.

FIG. 9 is a chart for illustrating the determination method of the type of screen in the case in which the control value of the amount of toner applied at the time of "the amount of toner applied 1" is 200%, and in the case in which the control value of the amount of toner applied at the time of "the amount of toner applied 2" is 100%.

The case in which the control value of the amount of toner applied is 200%, placing importance on the stability of density or the prevention of discontinuity, applies the low screen ruling. On the other hand, the case in which the control value of the amount of toner applied is 100%, as compared with the case in which the control value of the amount of toner applied is 200%, raises a problem in jaggy or discontinuity resulted from pseudo halftone processing. In the above-described example, in the case in which the control value of the amount of toner applied is 200%, data of R=0, G=0, B=255 are converted to C=100, M=100, Y=0 and K=0, not to be affected by halftones. However, in the case in which the control value of the amount of toner applied is 100%, data of R=0, G=0, B=255 are converted to C=50, M=50, Y=0 and K=0, to be affected by halftones. This embodiment, paying attention to the chromaticity of an input image, applies the high screen ruling only in the region of clear edges in the input image. That is, the high screen ruling is applied only in the region 2 where in the input image, the saturation is higher than a saturation threshold, and the luminance is lower than a luminance threshold. The data of R=0, G=0, B=255 described as an example is of the chromaticity to be determined as the region 2. By applying the high screen ruling to this region, even in the case in which the amount of toner applied is controlled to 100%, it comes to be possible to prevent image deterioration at the edge portions while keeping the stability of density and the prevention of discontinuity.

Nevertheless, with respect to the region of black characters (region of low saturation as well as low luminance), exceptionally, the high screen ruling is applied. Furthermore, the resolution of the high screen ruling applied to the region of black characters is the same as that applied to the region where the saturation is determined to be higher than the saturation threshold, as well as the luminance is determined to be lower than the luminance threshold. This reason is that application of the screen of a considerably large resolution results in slower processing or larger scale hardware. It is common also in the cases of the below-described second embodiment and third embodiment that resolutions of the high-resolution screen are the same in such a way.

Figure 10:
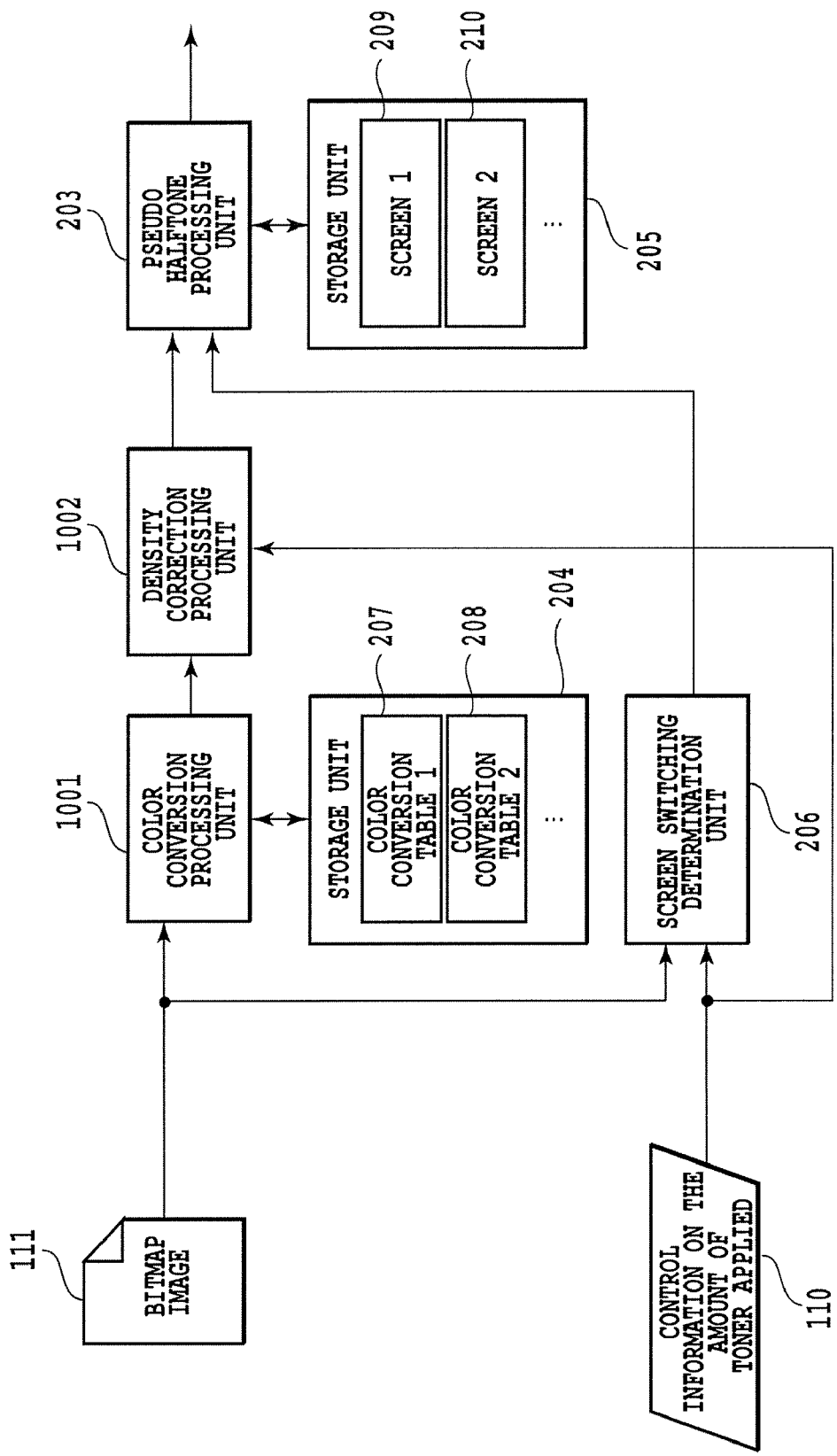
FIG. 10 is a block diagram illustrating another configuration example of an image processing unit in the first embodiment.

FIG. 10 is a block diagram illustrating another configuration example of an image processing unit 108.

In the image processing unit 108 illustrated in FIG. 10, a color conversion processing unit 1001 and a density correction processing unit 1002 are different from those of the image processing unit 108 illustrated in FIG. 2.

In the above-described embodiment, in the color conversion processing unit 1001, no switching among color conversion tables based on the control information on the amount of toner applied 110 is performed. Instead, the density correction processing unit 1002 switches a density correction processing based on the control information on the amount of toner applied 110.

Figure 11:
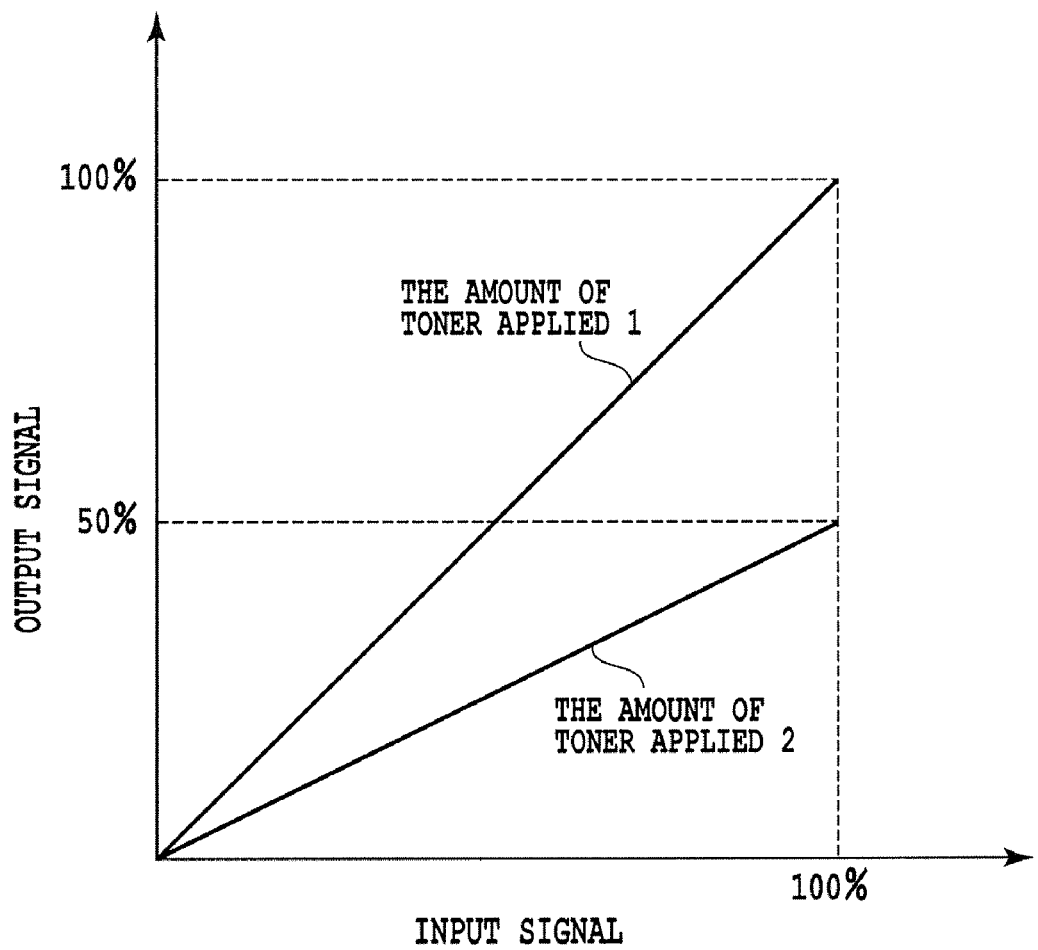
FIG. 11 is a chart for illustrating one example of switching of a density correction processing based on control information on the amount of toner applied in the first embodiment.

FIG. 11 is a chart for illustrating one example of switching of the density correction processing based on the control information on the amount of toner applied 110.

When the control information on the amount of toner applied 110 specifies "the amount of toner applied 1", there is no change in an image data to be output with respect to input image data. On the other hand, in the case of "the amount of toner applied 2", signals of the input image data are processed to be decreased by half and output. Thus, in the case in which the color conversion table 1 of 200% control of the amount of toner applied is applied at the color conversion processing unit 901, it is held to be under 200% control of the amount of toner applied as it is at "the amount of toner applied 1". Whereas, in the case in which the control information on the amount of toner applied is "the amount of toner applied 2", all the signals are decreased by half, and the amount of toner applied is controlled to be at 100%. Incidentally, different from the control of the amount of toner applied with the color conversion tables, under the 100% control of the amount of toner applied in density correction processing, data of R=0, G=255, B=255 is converted to C=50, M=0, Y=0 and K=0. Also in this case, from the chromaticity of the input image data (in this case, R=0, G=255, B=255), the region 2 is determined, whereby the high screen ruling is applied, thus enabling to suppress image deterioration.

As described above, according to this embodiment, without using an edge determination function, the chromaticity is calculated from color signals before color conversion, and a screen ruling for image formation is changed in accordance with the relationship between luminance and saturation, to be optimized to characteristics of an input image data. As a result, by the control of the amount of toner applied, even in the case of the occurrence of changes in density, image deterioration at the edge portions can be prevented.

Second Embodiment

According to the first embodiment, chromaticity is calculated from color signals before color conversion, and switching among screens is determined. However, execution of color conversion processing different from print processing in order to determine switching among screens is disadvantageous in respect of performance.

In the second embodiment, from signal values of image data without calculating chromaticity, a region of switching a screen is determined more easily.

A system configuration of an image processing device in the second embodiment is the same as that of the first embodiment, so that detailed descriptions will be omitted.

Figure 12:
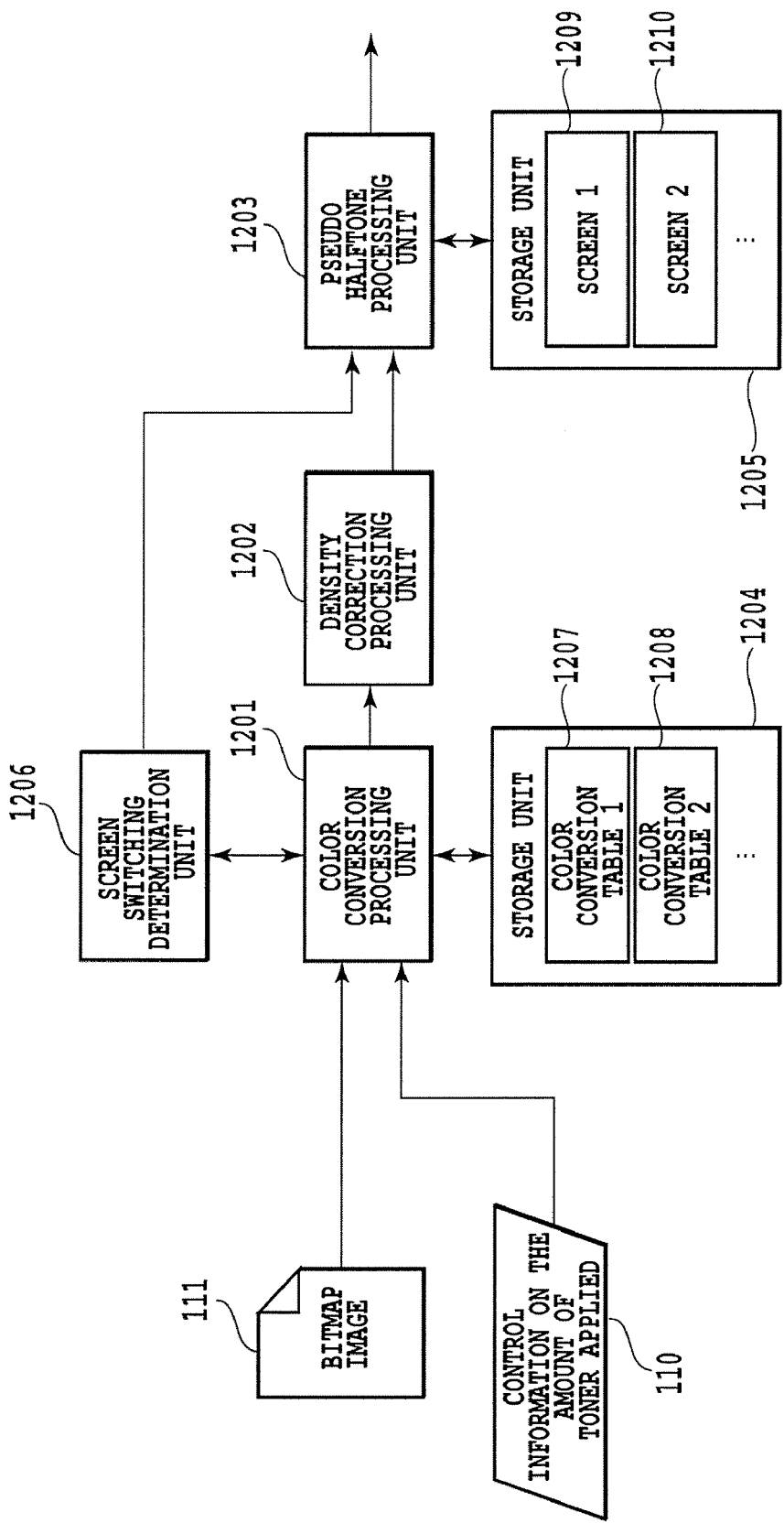
FIG. 12 is a block diagram illustrating a configuration example of an image processing unit in a second embodiment.

FIG. 12 is a block diagram illustrating a configuration example of the image processing unit 108 in the second embodiment.

A color conversion processing unit 1201, as is the first embodiment, makes switching among color conversion tables based on the control information on the amount of toner applied 110 to perform color conversion processing.

Although the screen switching determination unit 206 according to the first embodiment converts input image data to the uniform perceptual color space, and thereafter makes a region determination based on the value of chromaticity, a screen switching determination unit 1206 according to the second embodiment makes a region determination based on signal values of the input image data before execution of color conversion processing.

Figure 13:
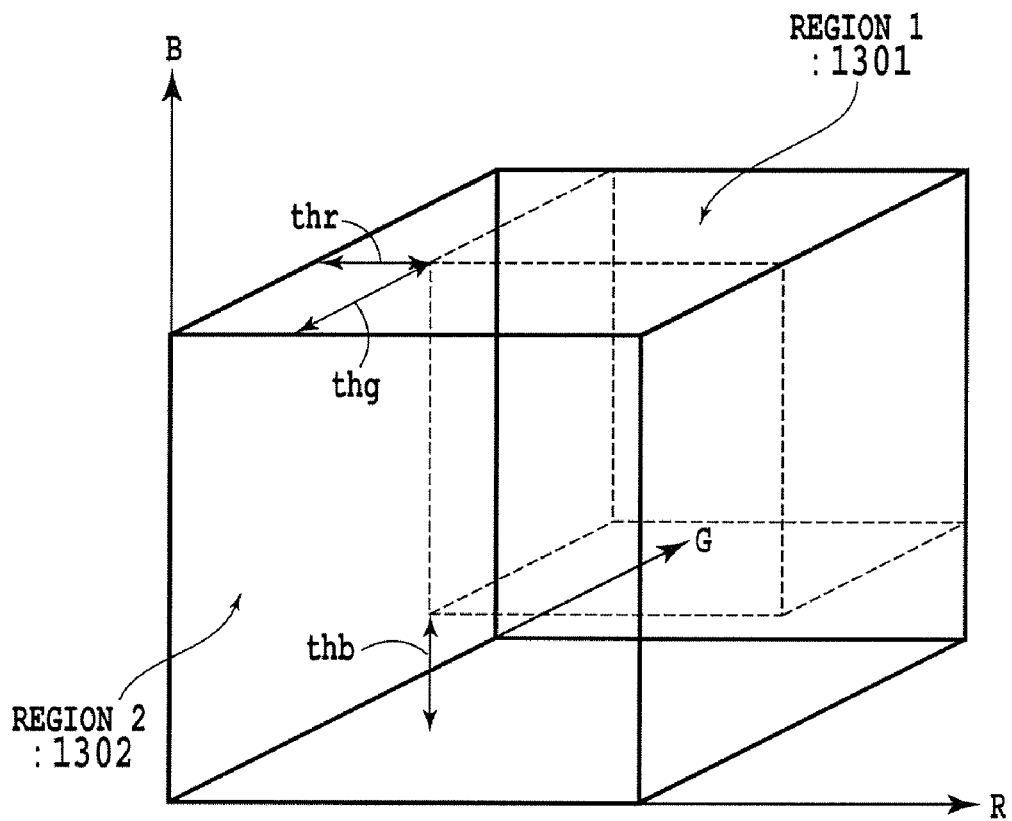
FIG. 13 is a chart for illustrating a determination method of a region in the second embodiment in an input color space.

FIG. 13 is a chart for illustrating the determination method of a region in the second embodiment in an input color space.

The input color space is the RGB color space, being the color space of a bitmap image. In the second embodiment, the RGB color space is divided into two regions of a region 1 (1301) and a region 2 (1302).

On the occasion when the color conversion processing unit 1201 performs color conversion processing of image data, the screen switching determination unit 1206 compares RGB values and predetermined thresholds thr, thg and thb. As a result of comparison, in the case in which R>thr, G>thg and B>thb, the region (1301) is determined to be the region 1; and in the other cases, the region (1202) is determined to be the region 2.

Although in the first embodiment, it is determined based on luminance and saturation whether or not edge information of input image before color conversion processing is clear, in the second embodiment, the same determination is made with respect to the RGB signals. That is, in the second embodiment, the thresholds thr, thg and thb are set with respect to the RGB signals, and a region determination is made based on results of comparison between each signal value and each threshold. For example, in the case in which all the signal values of the RGB signals are higher than the thresholds, since the luminance is high, the region is determined to be the region 1. Furthermore, in the case in which all the signal values of the RGB signals are lower than the thresholds, since the luminance is low, the region is determined to be the region 2. In the case in which any one or two signal values of the RGB signals are higher than the thresholds, and two or one signal value is lower than the threshold, since the saturation is high, the region is determined to be the region 2. In such a way, by setting the thresholds with respect to image data to be color-converted, a region determination can be made.

Incidentally, the thresholds thr, thg and thb may be different from each other. Furthermore, each threshold can be suitably set with respect to each of the color conversion tables applied on the occasion of conversion.

With respect to the input image data, after being region-determined based on the input signals as described above, the type of screen to be used in each pixel is determined based on the region determination result and the control information on the amount of toner applied 110.

That is, with respect to a pixel determined to be the region 2 in "the amount of toner applied 2", the high screen ruling is applied. The method of determining a screen based on region determination and the control information on the amount of toner applied is the same as the first embodiment, so that descriptions will be omitted.

As described above, according to the second embodiment, without using an edge determination function, the screen ruling for image formation is changed based on color signals before color conversion, to be optimized to characteristics of input image data. As a result, even in the case of the occurrence of changes in density by the control of the amount of toner applied, image deterioration at the edge portions can be prevented.

Third Embodiment

In the first and second embodiments, the control information on the amount of toner applied are described to be "the amount of toner applied 1" and "the amount of toner applied 2"; while in a third embodiment, they are described to be "normal mode" and "amount of toner applied-reduction mode". Although in "the amount of toner applied-reduction mode", the amount of toner applied is less than that in "the normal mode", less image deterioration is desired even if the amount of toner applied is reduced.

The region of especially large image deterioration on the occasion of reduction in the amount of toner applied is the region which density value is output to be high in "the normal mode". That is, the region which density value is high in "the normal mode" and which is less likely to be affected by halftones comes to be halftone colors in "the amount of toner applied-reduction mode" in which the amount of toner applied is reduced. As a result, jaggy or discontinuity not having occurred in "normal mode" will take place.

The third embodiment, focusing on the region of much image deterioration on the occasion of switching from "the normal mode" to the "amount of toner applied-reduction mode", applies the high screen ruling to this region, thereby preventing image deterioration.

The system configuration of an image processing device in the third embodiment is the same as that of the first embodiment, so that descriptions will be omitted.

Figure 14:
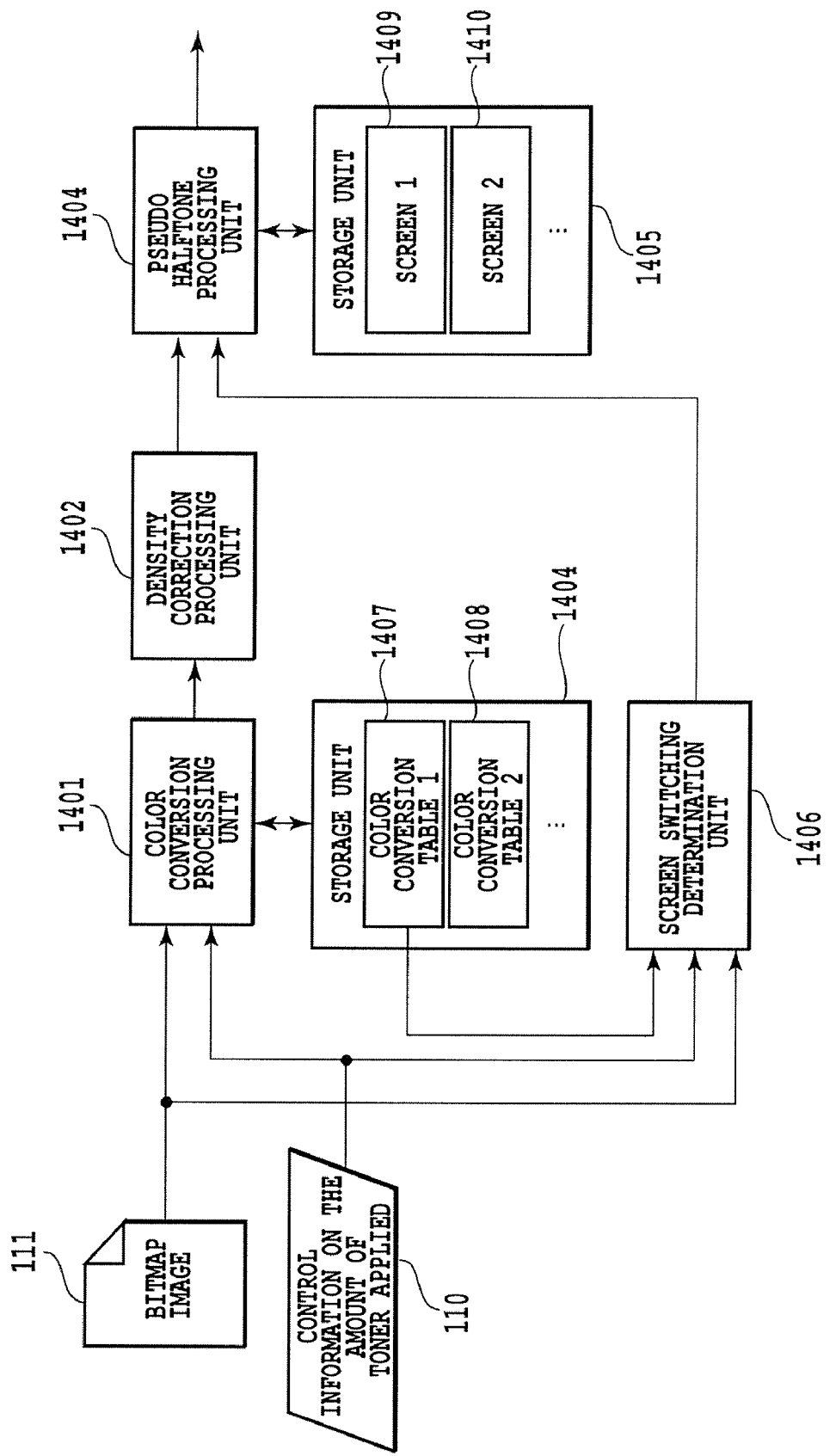
FIG. 14 is a block diagram illustrating a configuration example of an image processing unit in a third embodiment.

FIG. 14 is a block diagram illustrating a configuration example of the image processing unit 108.

A color conversion table 1 (1407) is the one to be used in "the normal mode", and a color conversion table 2 (1408) is the one to be used in the "the amount of toner applied-reduction mode". In comparison between the color conversion table 1 and the color conversion table 2, the amount of toner applied is larger in the color conversion table 1.

A screen switching determination unit 1406, different from the first embodiment, determines the type of screen to be applied based on a bitmap image, the control information on the amount of toner applied, and a color conversion table 1.

Figure 15:
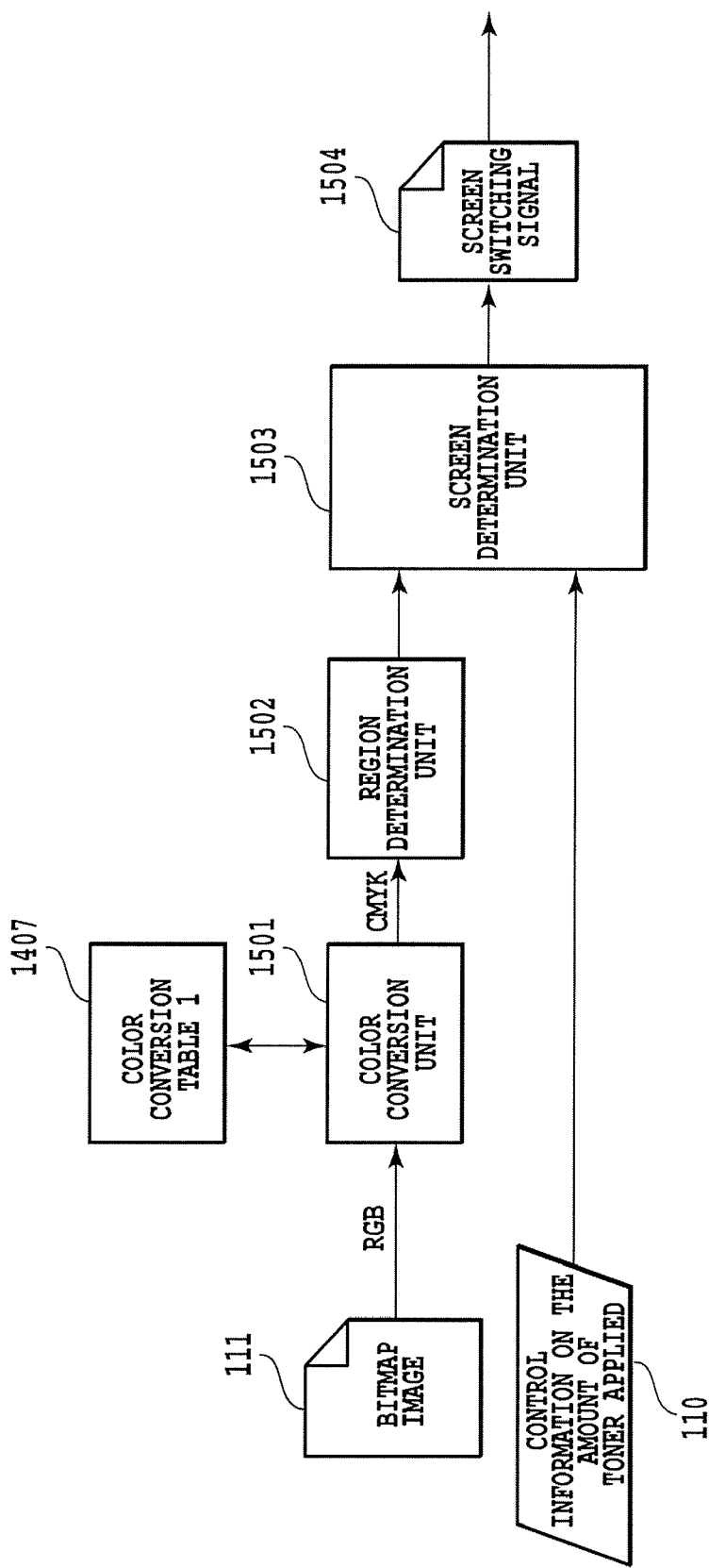
FIG. 15 is a block diagram illustrating a configuration example of a screen switching unit in the third embodiment.

FIG. 15 is a block diagram illustrating a configuration example of the screen switching determination unit 1407.

The screen switching determination unit 1407 includes a color conversion unit 1501, a region determination unit 1502 and a screen determination unit 1503.

The color conversion unit 1501 performs color conversion processing of the bitmap image 111. In a third embodiment, the color conversion unit 1501 makes a color conversion from the RGB color space to the CMYK color space. A color conversion table to be applied for color conversion is the color conversion table 1 of "the normal mode" irrespective of the content of the control information on the amount of toner applied 110.

The region determination unit 1502 makes a region determination for screen switching with respect to the image data color-converted to the color space of CMYK. That is, to the region determination unit 1502, the image data converted into the color space of CMYK using the color conversion table 1 of "the normal mode" is input. The region determination unit 1502 makes comparison between the CMYK values in each pixel in this image data and predetermined thresholds thc, thm, thy and thk. As a result of comparison, in the case of any one of C>thc, M>thm, Y>thy and K>thk, the region is determined to be the region 2; and in the other cases, the region is determined to be the region 1.

The third embodiment intends to prevent image deterioration with respect to print results at the time of the normal amount of toner applied on the occasion of reducing the amount of toner applied. Thus, in case where at least one of the CMYK values corresponding to color material is higher than a predetermined density on the occasion of color conversion processing in "the normal mode", the region is determined to be the region 2.

With respect to the input image data, as described above, after region-determined based on the image color-converted at the time of the normal amount of toner applied, the screen to be used in each pixel is determined based on the region determination result and the control information on the amount of toner applied 110. That is, with respect to the pixel that is determined to be the region 2 in "the amount of toner applied-reduction mode", the high screen ruling is applied. The method of determining a screen from region determination and the control information on the amount of toner applied is the same as that of the first embodiment, so that descriptions will be omitted.

As described above, according to the third embodiment, due to that without using the edge determination function, the screen ruling for image formation is changed in accordance with a density signal after color conversion at the time of the normal amount of toner applied, even in the case in which a change in density occurs by the control of the amount of toner applied, image deterioration at the edge portions can be prevented.

Fourth Embodiment

In the first to third embodiment, in switching among screens, object information such as characters, graphics and images that are included in the drawing command are not taken into consideration. Thus, a fourth embodiment, in addition to the chromaticity of input image data, takes object information also into consideration, thereby making more optimum switching among screens.

The system configuration of an image processing device in the fourth embodiment is the same as that of the first embodiment, so that descriptions will be omitted.

The rendering processing unit 107 generates a bitmap image 111, and generates attribute information indicating which image characteristics each image possesses. Examples of attribute information include a text attribute, an image attribute and a graphic attribute. Character data has the text attribute, dot map data has the image attribute, and draw data has the graphic attribute. The rendering processing unit 107 extracts these attribute information from a data drawing instruction in the drawing command. Further, the rendering processing unit 107 adds attribute information to each pixel of the bitmap image 111.

Figure 16:
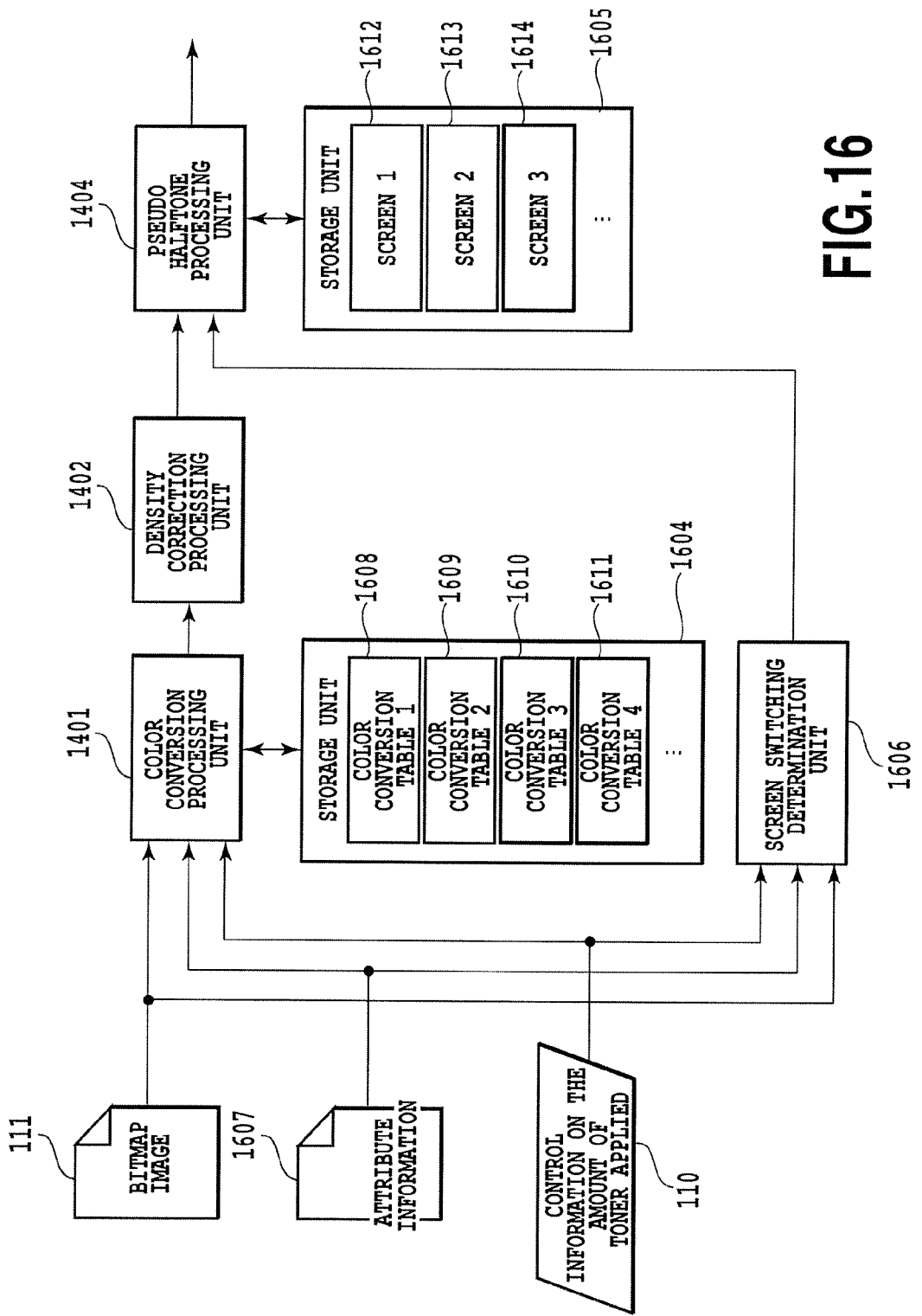
FIG. 16 is a block diagram illustrating a configuration example of an image processing unit in a fourth embodiment.

FIG. 16 is a block diagram illustrating a configuration example of the image processing unit 108.

The image processing unit 108 includes a color conversion processing unit 1601, a density correction processing unit 1602, a pseudo halftone processing unit 1603, a storage unit 1604, a storage unit 1605 and a screen switching determination unit 1606. The storage unit 1604 stores color conversion tables, and the storage unit 1605 stores screens.

The color conversion processing unit 1601, as are the first to third embodiments, refers to the color conversion tables, and converts a bitmap image 110 rendered in an RGB color space to image data rendered in a CMYK color space. In particular, in the fourth embodiment, the color conversion processing unit 1601 switches among color conversion tables to be referred, on the basis of the control information on the amount of toner applied 110 and attribute information 1607. That is, the color conversion processing unit 1601 makes switching among the color conversion tables based on an object included in the bitmap image 110 to perform color conversion.

FIG. 17 is a chart showing the method of switching among the color conversion tables to be applied in color conversion processing.

The attribute information 1607 includes a text attribute, a graphics attribute and an image attribute.

In the case in which the control information on the amount of toner applied 110 is the amount of toner applied 1, and the attribute information is the text attribute or the graphics attribute, a color conversion table 1 is used. In the case in which the control information on the amount of toner applied 110 is the amount of toner applied 1, and the attribute information is the image attribute, a color conversion table 2 is used. In the case in which the control information on the amount of toner applied 110 is the amount of toner applied 2, and the attribute information is the text attribute or the graphics attribute, a color conversion table 3 is used. In the case in which the control information on the amount of toner applied 110 is the amount of toner applied 1, and the attribute information is the image attribute, a color conversion table 4 is used.

The color conversion table 1 and the color conversion table 2 are assumed to have substantially the same control value of the amount of toner applied, and have different UCR amounts. The color conversion table 3 and the color conversion table 4 are controlled with the amount of toner applied different from that of the color conversion table 1 and the color conversion table 2, and have different UCR amounts.

In such a manner, the color conversion processing unit 1601 makes switching among the color conversion tables based on the control information on the amount of toner applied 110 and the attribute information.

The density correction processing unit 1502 performs density correction processing on the color-converted image data.

The screen switching determination unit 1606 makes switching among screens based on the chromaticity of the input image data, the control information on the amount of toner applied 110 and the attribute information 1607.

Figure 18:
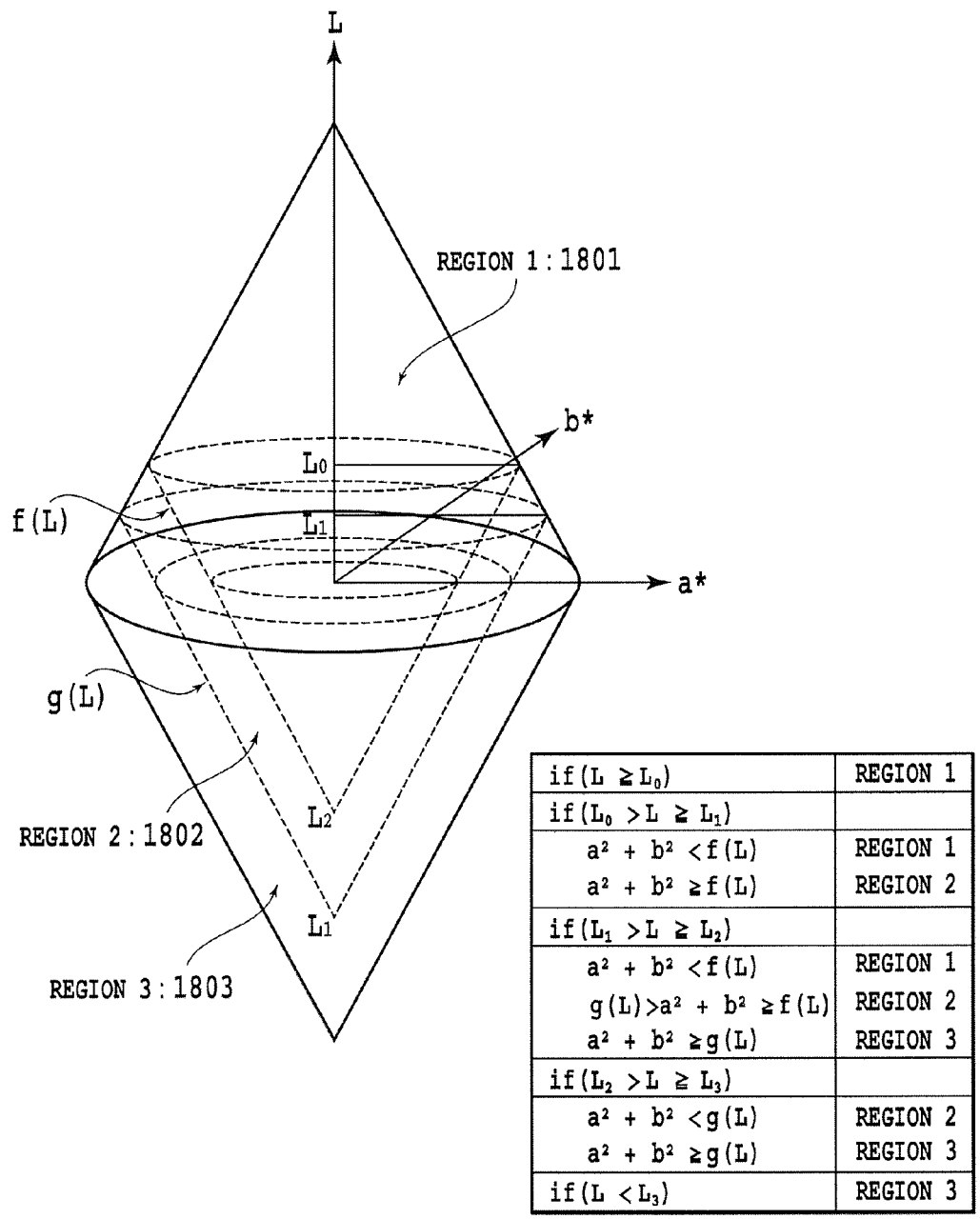
FIG. 18 is a chart illustrating a determination method of a region in the fourth embodiment in the uniform perceptual color space.

FIG. 18 is a chart illustrating the determination method of a region in the uniform perceptual color space.

FIG. 18 employs the CIE-Lab color space as the uniform color space. In this embodiment, in the CIE-Lab color space, the color space is divided into three regions of a region 1 (1801), a region 2 (1802) and a region 3(1803).

Hereinafter, with reference to FIG. 18, the division method of a region will be described.

As is the first embodiment, on the occasion of region division, luminance L and saturation $(a^2+b^2)$ are referred to. Furthermore, such a predetermined luminance L0, L1, L2 and L3 as to be L0>L1>L2>L3 are set.

The luminance L of the pixel of the input image data and the luminance L0 are compared, and in the case in which the luminance L is larger than the luminance L0, the region is determined to be the region 1. In addition, the luminance L and the luminance L3 are compared, and in the case in which the luminance L is smaller than the luminance L3, the region is determined to be the region 3. Further, in the case in which the luminance L is not less than the luminance L1 and less than the luminance L0, a threshold f (L) based on the luminance L is set. Subsequently, when the input saturation $(a^2+b^2)$ of the pixel is not less than the threshold f (L), the region is determined to be the region 2; and when it is less than the threshold f (L), the region is determined to be the region 1. Moreover, another threshold g (L) based on the luminance L is set. In the case in which the luminance L is not less than the luminance L2 and less than the luminance L1, when the input saturation $(a^2+b^2)$ of the pixel is not less than the threshold g (L), the region is determined to be the region 3; when it is less than g (L) and not less than f (L), the region is determined to be the region 2; and when it is less than f (L), the region is determined to be the region 1. In the case in which the luminance L is not less than the luminance L3 and less than the luminance L2, when the input saturation $(a^2+b^2)$ of the pixel is not less than the threshold g (L), the region is determined to be the region 3; and when it is less than g (L), the region is determined to be the region 2.

Since the region is divided into three types based on chromaticity in such a way, switching of processing more based on characteristics of the input image can be made. Incidentally, the thresholds f (L) and g (L) may be substantially linear as illustrated in FIG. 16, or may be obtained by e.g., the method of reference from the luminance L using a lookup table.

With respect to the input image data, after region-determined based on chromaticity as described above, the screen to be used with respect to each pixel is determined based on the region determination result and the control information on the amount of toner applied 110.

FIG. 19 is a table for illustrating the determination method of a screen at the screen determination unit.

The pseudo halftone processing unit 1603 performs processing by switching among three types of screens of a screen 1 (1612), a screen 2 (1613) and a screen 3 (1614).

The pseudo halftone processing unit 1603 determines a screen based on the region determination result and the attribute information.

The pseudo halftone processing unit 1603, when the region determination result is "region 1", irrespective of the type of object, "screen 1" is applied. When the region determination result is "region 2", "screen 2" is applied to the object of text and graphic, and "screen 1" is applied to the object of image. When the region determination result is "region 3", "screen 3" is applied to the object of text, "screen 2" is applied to the object of graphic, and "screen 1" is applied to the object of image.

Since the pseudo halftone processing unit 1603 makes switching among screens depending on the object, as well as makes switching among screens depending on the chromaticity of the pixel of input image, even with the same object, there is a possibility of the occurrence of switching among screens. Then, to prevent discontinuity or a density gap at the portion where a screen is switched, three types of screens are used as follows.

Figure 20:
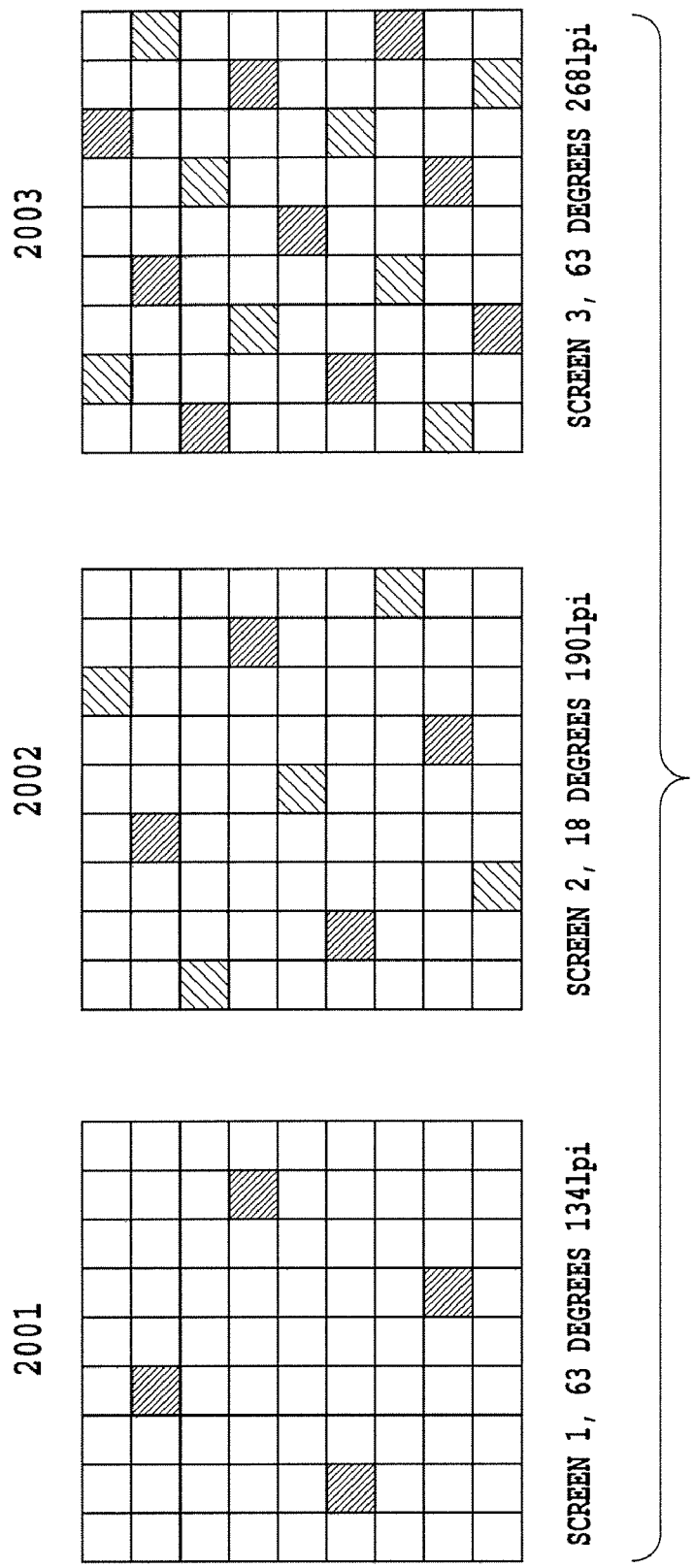
FIG. 20 is a chart illustrating an example of screens to be used in the fourth embodiment.

FIG. 20 is a chart illustrating an example of screens.

Reference numeral 2001 designates the screen 1, reference numeral 2002 designates the screen 2, and reference numeral 2003 designates the screen 3. As to a screen ruling, the screen ruling of the screen 3 is the highest, and the screen ruling of the screen 1 is the lowest. These three screens, in growth patterns thereof, the screen 1 is of 63 degrees and 134 lpi, the screen 2 is of 18 degrees and 190 lpi, and the screen 3 is of 63 degrees and 268 lpi. As with the screen examples illustrated in the first embodiment, points indicated with more dense dots at the growing points of the screens are positioned in the same growing points of the screens of lower screen ruling. As a result, even if each screen is applied to adjacent pixels in a certain region, no problem of discontinuity at the boundary line arises.

The pseudo halftone processing unit 1603 performs pseudo halftone processing of switching a screen in each pixel based on screen switching determination results.

As described above, the present invention, without using an edge determination function, calculates the chromaticity from the type of object as well as a color signal before color conversion, and modifies the screen ruling for image formation based on the relationship between luminance and saturation, to be optimized to characteristics of the input image data. As a result, even in the case of the occurrence of changes in density by the control of the amount of toner applied, image deterioration at the edge portions can be prevented.

Another Embodiment

An object of the present invention is also achieved by a program code that performs operations (steps) of the configuration illustrated in the above-described embodiments being read and executed by a computer (or CPU or MPU) of a system or a device from a recording medium in which this program code is recorded. The recording medium is a computer-readable recording medium. In this case, the program code itself having been read out from the computer-readable recording medium does implement the functions of the above-described embodiments. Therefore, these program code and recording medium in which the program code is recorded also form one of the present invention.

As the recording medium for providing the program code, employed can be, for example, a floppy (trade mark) disk, a hard disk, an optical disk, an magnetic optical disk, CD-ROM, a magnetic tape, a non-volatile memory card, and ROM.

Furthermore, also included is the case in which e.g., OS (operating system) being operated on the computer based on instructions of the foregoing program code executes a part or all of an actual processing, and the functions of the above-described embodiments are implemented by this processing.

In addition, the program code having been read out from the recording medium is written in a memory that is provided at an expanded board inserted in the computer or an expanded unit connected to the computer. Thereafter, based on instructions of this program code, the CPU and the like provided at these expanded board or expanded unit executes a part or all of an actual processing, and the functions of the above-described embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-258871, filed Oct. 2, 2007, which is hereby incorporated by reference herein in its entirety.

What is claimed is:

1. A print apparatus comprising:
a conversion unit configured to perform color conversion for a bitmap image with RGB to obtain a bitmap image with CMYK;
an application unit configured to apply a screen to the obtained bitmap image with CMYK; and
a print unit configured to print a result of the application, the print apparatus further comprising:
a color conversion unit configured to perform color conversion for a bitmap image with RGB to obtain a bitmap image with Lab; and
a determination unit configured to determine whether or not each pixel in the obtained bitmap image with Lab has lower brightness than a brightness threshold and has higher saturation than a saturation threshold which is set for each brightness,
wherein the application unit applies a high screen ruling to a pixel which is determined as having lower brightness than the brightness threshold and having higher saturation than the saturation threshold which is set for each brightness, the high screen ruling being a higher screen ruling than a screen ruling that is applied to a pixel which is determined as having brightness equal to the brightness threshold or more or having saturation equal to the saturation threshold, which is set for each brightness, or less.

2. A print apparatus comprising:
a first conversion unit configured to perform color conversion for a bitmap image with RGB to obtain a bitmap image with CMYK in which a total of CMYK value of each pixel is a first threshold or less;
a second conversion unit configured to perform color conversion for a bitmap image with RGB to obtain a bitmap image with CMYK in which a total of CMYK value of each pixel is a second threshold or less, wherein the second threshold is less than the first threshold;
an application unit configured to apply a screen to the obtained bitmap image with CMYK; and
a print unit configured to print a result of the application, the print apparatus further comprising:
a color conversion unit configured to perform color conversion for a bitmap image with RGB to obtain a bitmap image with Lab; and
a determination unit configured to determine whether or not each pixel in the obtained bitmap image with Lab has lower brightness than a brightness threshold and has higher saturation than a saturation threshold which is set for each brightness,
wherein the application unit is further configured to:
apply a first screen ruling to the bitmap image with CMYK obtained by the second conversion unit;
apply the first screen ruling to a pixel in the bitmap image with CMYK obtained by the first conversion unit, the pixel being that determined as having brightness equal to the brightness threshold or more or having saturation equal to the saturation threshold, which is set for each brightness, or less; and
apply a second screen ruling, which is a higher screen ruling than the first screen ruling, to a pixel in the bitmap image with CMYK obtained by the first conversion unit, the pixel being that determined as having lower brightness than the brightness threshold and having higher saturation than the saturation threshold which is set for each brightness.

3. A print method comprising:
a conversion step of performing color conversion for a bitmap image with RGB to obtain a bitmap image with CMYK;
an application step of applying a screen to the obtained bitmap image with CMYK; and
a print step of printing a result of the application, the print method further comprising:
a color conversion step of performing color conversion for a bitmap image with RGB to obtain a bitmap image with Lab; and
a determination step of determining whether or not each pixel in the obtained bitmap image with Lab has lower brightness than a brightness threshold and has higher saturation than a saturation threshold which is set for each brightness,
wherein the application step applies a high screen ruling to a pixel which is determined as having lower brightness than the brightness threshold and having higher saturation than the saturation threshold which is set for each brightness, the high screen ruling being a higher screen ruling than a screen ruling that is applied to a pixel which is determined as having brightness equal to the brightness threshold or more or having saturation equal to the saturation threshold, which is set for each brightness, or less.

4. A print method comprising:
a first conversion step of performing color conversion for a bitmap image with RGB to obtain a bitmap image with CMYK in which a total of CMYK value of each pixel is a first threshold or less;
a second conversion step of performing color conversion for a bitmap image with RGB to obtain a bitmap image with CMYK in which a total of CMYK value of each pixel is a second threshold or less, wherein the second threshold is less than the first threshold;
an application step of applying a screen to the obtained bitmap image with CMYK; and
a print step of printing a result of the application, the print method further comprising:
a color conversion step of performing color conversion for a bitmap image with RGB to obtain a bitmap image with Lab; and
a determination step of determining whether or not each pixel in the obtained bitmap image with Lab has lower brightness than a brightness threshold and has higher saturation than a saturation threshold which is set for each brightness, wherein the application step includes:

applying a first screen ruling to the bitmap image with CMYK obtained by the second conversion step;

applying the first screen ruling to a pixel in the bitmap image with CMYK obtained by the first conversion step, the pixel being that determined as having brightness equal to the brightness threshold or more or having saturation equal to the saturation threshold, which is set for each brightness, or less; and applying a second screen ruling, which is a higher screen ruling than the first screen ruling, to a pixel in the bitmap image with CMYK obtained by the first conversion step, the pixel being that determined as having lower brightness than the brightness threshold and having higher saturation than the saturation threshold which is set for each brightness.

5. A non-transitory computer-readable storage medium having stored thereon computer-executable instructions for performing a print method, the method comprising:

a conversion step of performing color conversion for a bitmap image with RGB to obtain a bitmap image with CMYK;

an application step of applying a screen to the obtained bitmap image with CMYK; and a print step of printing a result of the application, the print method further comprising:

a color conversion step of performing color conversion for a bitmap image with RGB to obtain a bitmap image with Lab; and a determination step of determining whether or not each pixel in the obtained bitmap image with Lab has lower brightness than a brightness threshold and has higher saturation than a saturation threshold which is set for each brightness, wherein the application step applies a high screen ruling to a pixel which is determined as having lower brightness than the brightness threshold and having higher saturation than the saturation threshold which is set for each brightness, the high screen ruling being a higher screen ruling than a screen ruling that is applied to a pixel which is determined as having brightness equal to the brightness threshold or more or having saturation equal to the saturation threshold, which is set for each brightness, or less.

6. A non-transitory computer-readable storage medium having stored thereon computer-executable instructions for performing a print method, the method comprising:

a first conversion step of performing color conversion for a bitmap image with RGB to obtain a bitmap image with CMYK in which a total of CMYK value of each pixel is a first threshold or less;

a second conversion step of performing color conversion for a bitmap image with RGB to obtain a bitmap image with CMYK in which a total of CMYK value of each pixel is a second threshold or less, wherein the second threshold is less than the first threshold;

an application step of applying a screen to the obtained bitmap image with CMYK; and a print step of printing a result of the application, the print method further comprising:

a color conversion step of performing color conversion for a bitmap image with RGB to obtain a bitmap image with Lab; and a determination step of determining whether or not each pixel in the obtained bitmap image with Lab has lower brightness than a brightness threshold and has higher saturation than a saturation threshold which is set for each brightness, wherein the application step includes:

applying a first screen ruling to the bitmap image with CMYK obtained by the second conversion step;

applying the first screen ruling to a pixel in the bitmap image with CMYK obtained by the first conversion step, the pixel being that determined as having brightness equal to the brightness threshold or more or having saturation equal to the saturation threshold, which is set for each brightness, or less; and applying a second screen ruling, which is a higher screen ruling than the first screen ruling, to a pixel in the bitmap image with CMYK obtained by the first conversion step, the pixel being that determined as having lower brightness than the brightness threshold and having higher saturation than the saturation threshold which is set for each brightness.

* * * * *